US012793339B2

(12) United States Patent
Kim et al.

(10) Patent No.: US 12,793,339 B2
(45) Date of Patent: Nov. 10, 2026

(54) THREE-DIMENSIONAL RECONSTRUCTION USING GEOMETRY MODELS FOR INTERIOR SPACE MONITORING SYSTEMS AND APPLICATIONS

(71) Applicant: NVIDIA Corporation, Santa Clara, CA (US)

(72) Inventors: Dae Jin Kim, San Jose, CA (US); Rajath Bellipady Shetty, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 93 days.

(21) Appl. No.: 19/035,627

(22) Filed: Jan. 23, 2025

(65) Prior Publication Data

US 2026/0212597 A1 Jul. 23, 2026

(51) Int. Cl.
*G06T 17/10* (2006.01)
*G06T 7/11* (2017.01)
*G06T 7/73* (2017.01)

(52) U.S. Cl.
CPC ................ *G06T 17/10* (2013.01); *G06T 7/11* (2017.01); *G06T 7/73* (2017.01);
(Continued)

(58) Field of Classification Search
CPC ...................................................... G06T 17/10
See application file for complete search history.

(56) References Cited

U.S. PATENT DOCUMENTS 10,885,698 B2 1/2021 Muthler et al.
11,144,754 B2 10/2021 Hu et al.
(Continued)

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

(Continued)

*Primary Examiner* — Shivang I Patel
(74) *Attorney, Agent, or Firm* — Shook, Hardy & Bacon L.L.P.

(57) ABSTRACT

In various examples, geometry model-based three-dimensional reconstruction for interior space monitoring systems and applications are provided. An interior geometry model may be used to reconstruct a 3D geometry of an interior by selecting distinct regions of interest corresponding to interior surface regions. A point cloud representation of one or more selected regions may be generated using the vehicle interior geometry and a set of commonly oriented 3D bounding shapes (e.g., bounding boxes generated with respect to a shared coordinate system) may be generated to bound the selected interior surfaces. Bounded point cloud samples may be projected onto a surface using a surface fitting algorithm to estimate a best non-circumscribed polygon region model, which provides a geometric framework for reconstructing a 3D geometry that may be used to obtain direct measurements of 3D relationships between the selected regions of interest and OMS sensors.

20 Claims, 17 Drawing Sheets

(52) U.S. Cl.
CPC ............... *G06T 2207/20081* (2013.01); *G06T 2207/30201* (2013.01); *G06T 2210/12* (2013.01); *G06T 2210/56* (2013.01)

(56) References Cited

U.S. PATENT DOCUMENTS

| | | | | |
|---|---|---|---|---|
| 11,644,834 | B2 | 5/2023 | Ditty et al. | |
| 2020/0279499 | A1* | 9/2020 | Alvarez | G06F 30/15 |
| 2023/0256826 | A1* | 8/2023 | Paul | B60K 35/211<br>345/419 |
| 2026/0147460 | A1* | 5/2026 | Ogawa | B60K 35/81 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, Jun. 15, 2018, pp. 1-35.
ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.
IEC 61508, "Functional Safety of Electrical/Electronic/Programmable Electronic Safety-related Systems", Retrieved from Internet URL: https://en.wikipedia.org/wiki/IEC_61508, Accessed on Apr. 1, 2022, 7 pages.

* cited by examiner

THREE-DIMENSIONAL RECONSTRUCTION USING GEOMETRY MODELS FOR INTERIOR SPACE MONITORING SYSTEMS AND APPLICATIONS

BACKGROUND

An occupant monitoring system (OMS) is one component of advanced driver assistance systems (ADASs) that aims to improve the safety and comfort of drivers and other vehicle occupants by performing real-time assessments of drivers and other vehicle cabin occupants' presence, gaze, alertness, and/or other conditions. For example, an OMS—using data generated or obtained by sensors of a vehicle or other machine—may be used to track the direction of a driver's eye gaze, head pose, or blinking (for example, to detect drowsiness, fatigue, and/or distraction), for hand position and/or gesture detection, child and/or pet presence detection, and/or in conjunction with the operation of features such as, but not limited to, seat belt reminders, seat heating, and/or smart airbag deployment. Optical image sensor data may also be processed to extract image features to identify and classify the source of motion. Applications such as occupant gaze tracking rely on determining an accurate reconstruction of the car geometry such that a gaze vector can be mapped to a semantic region in the car. That is, eye detection algorithms (e.g., machine learning models) may use captured image data that captures the angle of rotation of an occupant's eyes (e.g., looking up, down, left, or right) to determine a gaze vector that can be translated to a reference frame of a three-dimensional (3D) reconstruction of the car geometry (e.g., a shared 3D coordinate system), and used to determine which semantic region the occupant is looking at based on which interior surfaces a predicted gaze vector is estimated to pass through.

SUMMARY

Embodiments of the present disclosure relate to geometry model-based three-dimensional reconstruction for interior space monitoring systems and applications. More specifically, the systems and methods presented in this disclosure provide for technologies for occupant gaze detection that may be used in a vehicle occupant monitoring system (OMS) to monitor a cabin's interior for safety and comfort applications.

In contrast to prior approaches for reconstructing a 3D geometry (e.g., a coordinate system) for a 3D volume representative of a vehicle interior, one or more of the embodiments described herein provide a process for generating an abstracted vehicle interior geometry based on an interior geometry model, for example, of a vehicle interior. For example, a computer assisted drawing (CAD) model (or other interior geometry model) may be used to reconstruct a 3D geometry of a vehicle interior while defining distinct regions of interest corresponding to interior surface regions that can be used by downstream tasks such as gaze estimation. A point cloud representation of one or more selected interior surface regions may be generated using the vehicle interior geometry and a set of commonly oriented 3D bounding shapes (e.g., bounding boxes generated with respect to a shared coordinate system) may be generated as boundaries for the selected interior surfaces. The bounded set of point cloud samples within an individual 3D bounding shape may then be projected onto a surface using a surface fitting algorithm (e.g., a convex hull algorithm) to estimate a best non-circumscribed polygon in three dimensions that defines a 3D region model associated with one of the selected interior surface regions.

Points on the polygonal 3D region model represent points of the vehicle interior surface within a selected region of interest, and are defined by coordinates of the bounding box within which they are located. Moreover, because the set of 3D bounding shapes are commonly oriented with respect to the same shared coordinate system, the relative positions and orientations (e.g., translations and rotation) of the resulting set of 3D polygonal region models representing the selected regions of interest are inherently known and co-oriented with each other. Generation of the set of 3D polygonal region models provides a geometric framework of 3D models for reconstructing a 3D geometry (e.g., a frame of reference and corresponding coordinate grid) that may be used to obtain direct measurements of 3D relationships between the selected regions of interest and OMS sensors that avoid inaccuracies that arise due to 3D reconstruction optimizations based on images of physical calibration targets. Moreover, the processes disclosed herein are applicable to regions of interest of arbitrary 3D shapes (e.g., the 3D polygonal region surface models are not limited to planar regions).

BRIEF DESCRIPTION OF THE DRAWINGS

The present systems and methods for geometry model-based three-dimensional reconstruction for interior space monitoring systems and applications are described in detail below with reference to the attached drawing figures, wherein.

DETAILED DESCRIPTION

Figure 1:
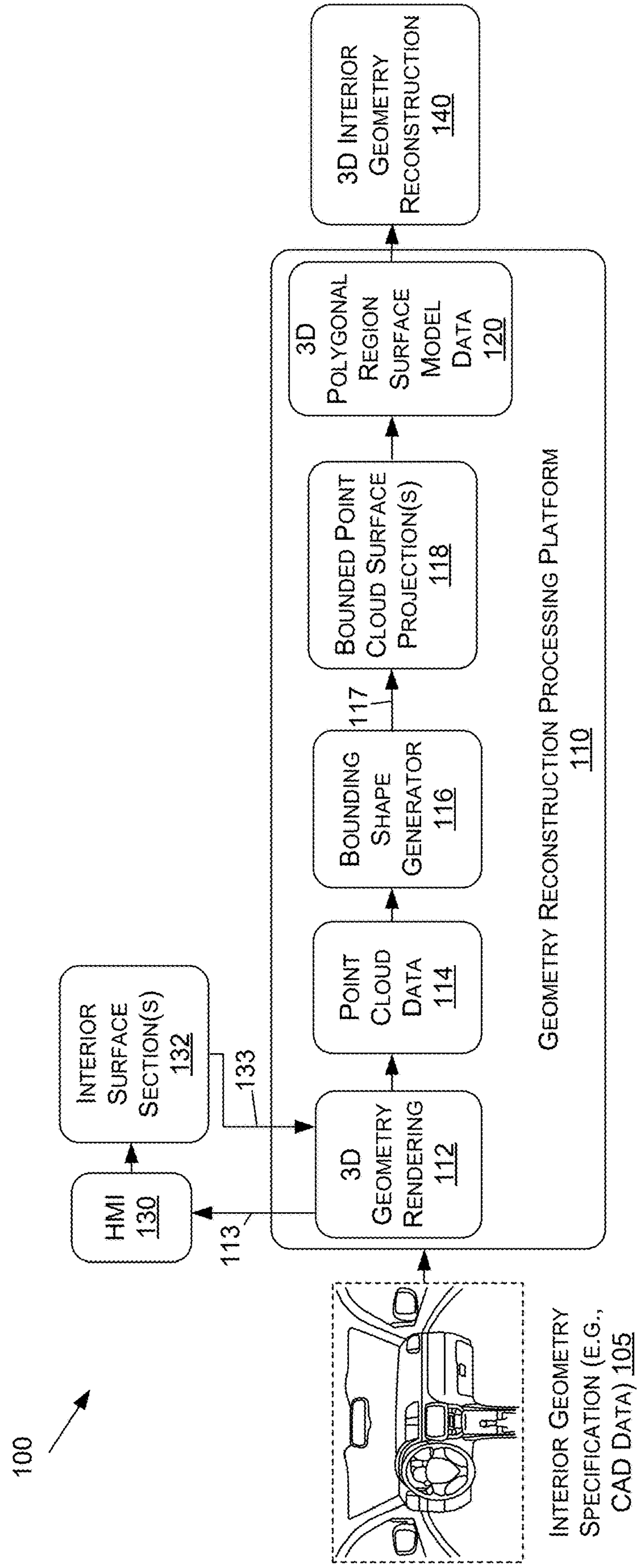
FIG. 1 is an example data flow diagram for a process for 3D interior geometry reconstruction, in accordance with some embodiments of the present disclosure.

Systems and methods are disclosed related to geometry model-based three-dimensional reconstruction for interior space monitoring systems and applications. Although the present disclosure may be described with respect to an example autonomous or semi-autonomous vehicle or machine 700 (alternatively referred to herein as "vehicle 700" or "ego machine 700," an example of which is described with respect to FIGS. 7A-7D), this is not intended to be limiting. For example, the systems and methods described herein may be used by, without limitation, non-autonomous vehicles or machines, semi-autonomous vehicles or machines (e.g., in one or more advanced driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. In addition, although the present disclosure may be described with respect to occupant monitoring systems for vehicles, this is not intended to be limiting, and the systems and methods described herein may be used in augmented reality, virtual reality, mixed reality, robotics, security and surveillance, autonomous or semi-autonomous machine applications, and/or any other technology spaces where systems for monitoring a space or environment may be used.

The present disclosure relates to vehicle occupant monitoring technologies. More specifically, the systems and methods presented in this disclosure provide for technologies for occupant gaze detection that may be used in a vehicle occupant monitoring system (OMS) to monitor a cabin's interior for safety and comfort applications.

In one or more prior solutions, a shared 3D coordinate system for sensors of a vehicle interior may be generated by reconstructing a 3D volume representative of the vehicle interior using relative positions of a plurality of calibration targets that are distributed across a field of view within a vehicle interior space. The plurality of calibration targets together may form a system of calibration targets that define a reference frame within the vehicle interior space for the 3D coordinate system. In some embodiments, the calibration targets may include a structural substrate (e.g., a generally planar board or sheet comprising a rigid material) that includes one or more fiducial point markers (alternatively referred to as "fiducial markers"). The one or more fiducial markers may comprise an array of visual fiducial system patterns, (e.g., ARtags, AprilTags, QR codes, etc.) that facilitate computing precise 3D position, orientation, and/or identification of the fiducial markers. The number of calibration targets in the system of calibration targets may vary as a function of the size of the interior space, but generally should be distributed to span the area to be monitored, have a diversity of alignments (e.g., arranged to align with at least two distinct intersecting planes within the interior space), and be sufficient in number to produce robust translation and rotation transforms. For a non-limiting example, for a typical vehicle cabin of a consumer automobile, the system of calibration targets may include five calibration targets with a calibration target positioned on the driver's seat cushion, a calibration target positioned on the driver's seat back cushion, a calibration target positioned on the front passenger's seat cushion, a calibration target positioned on the front passenger's seat back cushion, and a calibration target positioned on the center console between the driver's seat and the front passenger's seat. With the system of calibration targets in place, the 3D coordinate system may be generated using 3D reconstruction algorithms that generate 3D models of a space from a set of images. For example, in some embodiments, 3D reconstruction algorithms may be applied that take as input a plurality of images (e.g., on the order of 20 images) capturing each of the calibration targets—with their fiducial markers clearly visible. The camera(s) used to capture the images of calibration targets (at least for the purpose of 3D reconstruction) may be one or more cameras with known intrinsic parameters, and may include one or more of the optical image sensors of the interior monitoring system (e.g., red, green, blue (RGB) cameras, infra-red (IR) cameras, RGB-IR cameras, or other types of cameras), or other optical image sensors. Applying the plurality of images and camera intrinsic parameters as input, the 3D reconstruction algorithm may generate a rotation-translation (RT) transform (e.g., a transformation matrix) that maps from an individual calibration target's local reference system to a 3D coordinate system generated by the 3D reconstruction algorithm.

However, while calibration targets are typically rectangular planar boards, the surfaces of vehicle surfaces that may be the target of an occupant's case are generally not rectangular planar surfaces, but instead comprise regions having curved surfaces of varying geometries. Calibration targets are placed into approximate positions within a region of interest. Distances from fiducial markers to vertices that define the bounds of the region of interest are manually measured. As such, the 3D reconstruction algorithms that produce the 3D volume representative of the vehicle interior inherently do so based on approximations that the region of interest is a plane aligned to a plane of the calibration target fiducial markers. Such methods are laborious due to the need to place the calibration targets in precise locations, which is a process susceptible to human error. Moreover, such fiducial marker-based techniques result in the generation of a particular 3D reconstruction based on a particular arrangement of calibration targets, which may not be easily reproducible across multiple data collection sessions.

In contrast to prior approaches for reconstructing a 3D geometry (e.g., a coordinate system) for a 3D volume representative of a vehicle interior, one or more of the embodiments described herein provide a process for generating an abstracted vehicle interior geometry based on an interior geometry model (e.g., a computer-aided design (CAD) model of the vehicle interior, a vendor interior geometry specification, and/or a model built using a laser scanner and/or other technology).

For example, a CAD model (or other interior geometry model) may be used to reconstruct a 3D geometry of a vehicle interior while defining distinct regions of interest corresponding to interior surface regions that can be used by downstream tasks such as gaze estimation. A point cloud representation of one or more selected interior surface regions may be generated using the vehicle interior geometry and a set of commonly oriented 3D bounding shapes (e.g., bounding boxes generated with respect to a shared coordinate system) may be generated to bound the selected interior surfaces. The bounded set of point cloud samples within each individual 3D bounding shape may then be projected onto a surface using a surface fitting algorithm (e.g., a convex hull algorithm) to estimate a best non-circumscribed polygon in three dimensions that defines a 3D region model associated with one of the selected interior surface regions.

Points on the polygonal 3D region model represent points of the vehicle interior surface within a selected region of interest, and are defined by coordinates of the bounding box within which they are located. Moreover, because the set of 3D bounding shapes are commonly oriented with respect to the same shared coordinate system, the relative positions and orientations (e.g., translations and rotation) of the resulting set of 3D polygonal region models representing the selected regions of interest are inherently known and co-oriented with each other (e.g., along at least one axis). Generation of the set of 3D polygonal region models provides a geometric framework of 3D models for reconstructing a 3D geometry (e.g., a frame of reference and corresponding coordinate grid) that may be used to obtain direct measurements of 3D relationships between the selected regions of interest and OMS sensors, and which would also avoid potential inaccuracies that arise due to 3D reconstruction optimizations based on images of physical calibration targets. Moreover, the processes disclosed herein are applicable to regions of interest of arbitrary 3D shapes (e.g., the 3D polygonal region surface models are not limited to planar regions).

Although this geometry model-based process for three-dimensional reconstruction has been described with respect to vehicle interiors, it should be understood that in other embodiments the techniques described herein may be extended to other machines (e.g., robots) and external features of such machines. For example, a coordinate system derived from a 3D reconstruction as described herein may be used for controlling the position of a robotic arm to aim a light beam from a laser. The disclosed geometry model-based process can support a wide range of applications for which interior geometry models are available. For example, in automotive products, various interior sensing applications can leverage a JavaScript Object Notation (JSON) file of 3D polygon surface models (produced as described herein as a representation of an abstracted in-car geometry) that may facilitate operations and functions such as, but not limited to, driver's gaze observation, driver's fatigue estimation, driver's distraction status estimation, occupant's hand gesture recognition, child presence detection, and/or other occupant monitoring services in general.

With reference to FIG. 1, FIG. 1 is an example data flow diagram for a process for a 3D interior geometry reconstruction system 100 for an interior space monitoring system, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionalities to those of example autonomous vehicle 700 of FIGS. 7A-7D, example computing device 800 of FIG. 8, and/or example data center 900 of FIG. 9.

As shown in FIG. 1, an example 3D interior geometry reconstruction system 100 may comprise a geometry reconstruction processing platform 110 that can generate a 3D interior geometry reconstruction 140 (e.g., for an interior space such as a vehicle interior) based on a 3D geometry prior that defines one or more structural elements that define the interior space. More specifically, an interior geometry model, referred to herein as geometry specification data 105, may be applied as an input to the geometry reconstruction processing platform 110. The interior geometry specification data 105 may comprise a 3D model of the interior space (e.g., a CAD model). In some embodiments, the interior geometry specification data 105 may represent a vehicle interior space (e.g., a cabin, cargo space, or other interior space of a vehicle). However, the interior geometry specification data 105 are not limited to representations of a vehicle interior space. In some embodiments, interior geometry specification data 105 may represent structural features of spaces such as retail shops, bank lobbies, hospital rooms, warehouse areas, gymnasiums, containers, airport terminals, mines, factories, construction zones, and/or studio sets. That is, interior geometry specification data 105 may represent any interior space defined by a bounded spatially constrained 3D environment. It should be understood that an interior space need not be a fully enclosed or sealed space, but may include a partially enclosed volume having bounds definable by static structural features (e.g., an open-air stadium, pergola, gazebo, and/or amphitheater) that may be represented by a 3D model.

Figure 2A:
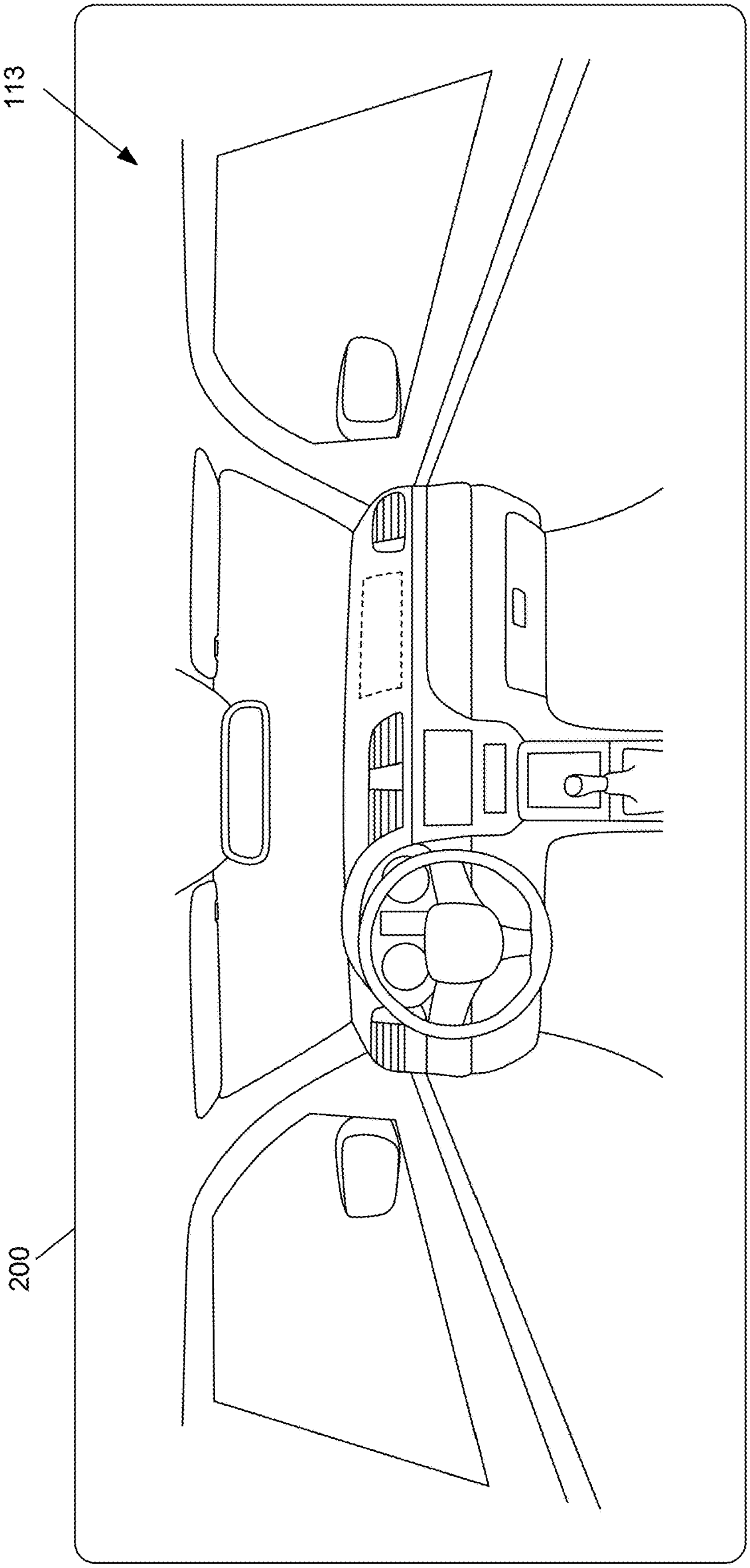
FIGS. 2A, 2B, and 2C illustrate the selection and generation of regions of interest for developing a 3D interior geometry reconstruction based at least on interior geometry specification data, in accordance with some embodiments of the present disclosure.

As shown in FIG. 1, the geometry reconstruction processing platform 110 comprises a 3D geometry rendering function 112 that may input the interior geometry specification data 105 and render an interior geometry presentation 113 for the interior space that may be presented on via a human-machine interface (HMI) 130 (e.g., a display and/or other presentation component such as a presentation component 818 of computing device 800). An example display 200 is illustrated in FIG. 2A of the interior geometry presentation 113 comprising the structural elements of the interior space of a vehicle. In some embodiments, by interacting with the HMI 130, a user may select one or more surfaces (shown as interior surface selection(s) 132) observable from interior geometry presentation 113, which may be used to define regions of interest (ROIs) 133 communicated back to the 3D geometry rendering function 112. In some embodiments, one or more interior surfaces from interior geometry presentation 113 may be selected as ROIs 133 by a surface selection algorithm (e.g., a machine learning algorithm/model) executed by geometry reconstruction processing platform 110 instead of, or in addition to, selection of ROIs 133 by a user via an HMI 130. For example, the geometry reconstruction processing platform 110 may comprise a surface selection machine learning model trained to predict surfaces within the interior to provide superior ROIs for the purpose of 3D geometry reconstruction.

Figure 2B:
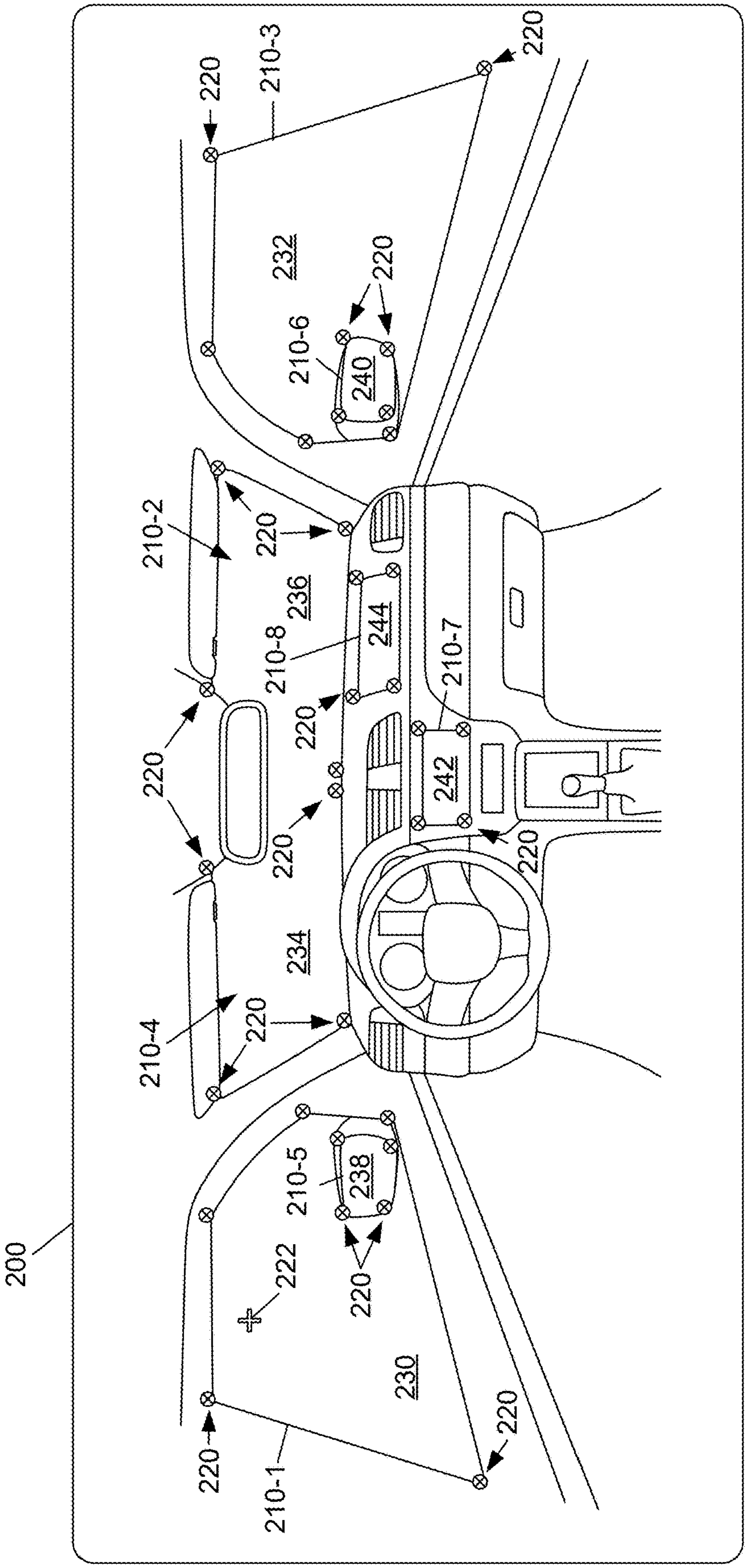

ROIs 133 may be defined by selecting, e.g., from interior geometry presentation 113, a set of interior surface locations that form a defined region (e.g., a closed polygon, or a partially open region). For example, as illustrated by the example in FIG. 2B, one or more ROIs 230 may be defined by selecting one or more sets of interior surface locations from the interior geometry presentation 113 (e.g., by a user using an HMI 130 and/or by a surface selection algorithm) to define one or more closed polygon regions. In the example of FIG. 2B, a user of HMI 130 may control a selection tool 222 (e.g., a cursor or pointing tool) to select surface points (shown at 220) that collectively bound a particular region of interest. For example, a first ROI 210-1 may comprise the surface of a front driver's side window (shown at 230). From the interior geometry presentation 113 surface points 220 may be chosen (e.g., using the selection tool 222) to define a closed polygon region around the front driver's side window. By selecting three or more surface points 220 around the front driver's side window from the rendering, the first ROI 210-1 may be defined as the region within the closed region formed by those surface points 220. As previously mentioned, an ROI 133 may be formed from a closed region (e.g., a closed polygon) and/or may be formed from a region that is less than fully closed (e.g., a partially open region).

In some embodiments, one or more additional regions of interest may be defined by selecting other sets of surface point 220 locations from the interior geometry presentation 113 to define additional closed polygon regions. For example, a second region of interest 210-2 may comprise the surface of the front passenger side of the vehicle windshield (shown at 236). By selecting three or more surface points 220 from around the front passenger side windshield region 236, the second ROI 210-2 may be defined as the region within the closed region formed by those points 220. The selection process may continue in this manner until a desired number of regions of interest 210 have been defined. In the example of FIG. 2B, other potential ROIs 210 are shown as including one or more of, for example and without limitation, a front passenger's side window ROI 210-3 (shown at 232), a front driver's side of the vehicle windshield ROI 210-4 (shown at 234), left and right rear view mirrors ROI 210-5 and ROI 210-6 (shown at 238 and 240), a center control console ROI 210-7 (shown at 242), and dashboard surface ROI 210-8 (shown at 244). It should be understood that these ROIs 210 are provided as example ROIs and in other embodiments, other regions may be selected from the interior geometry presentation 113 to define ROIs 210 (e.g., ROIs 210-1 to 210-8).

Figure 2C:
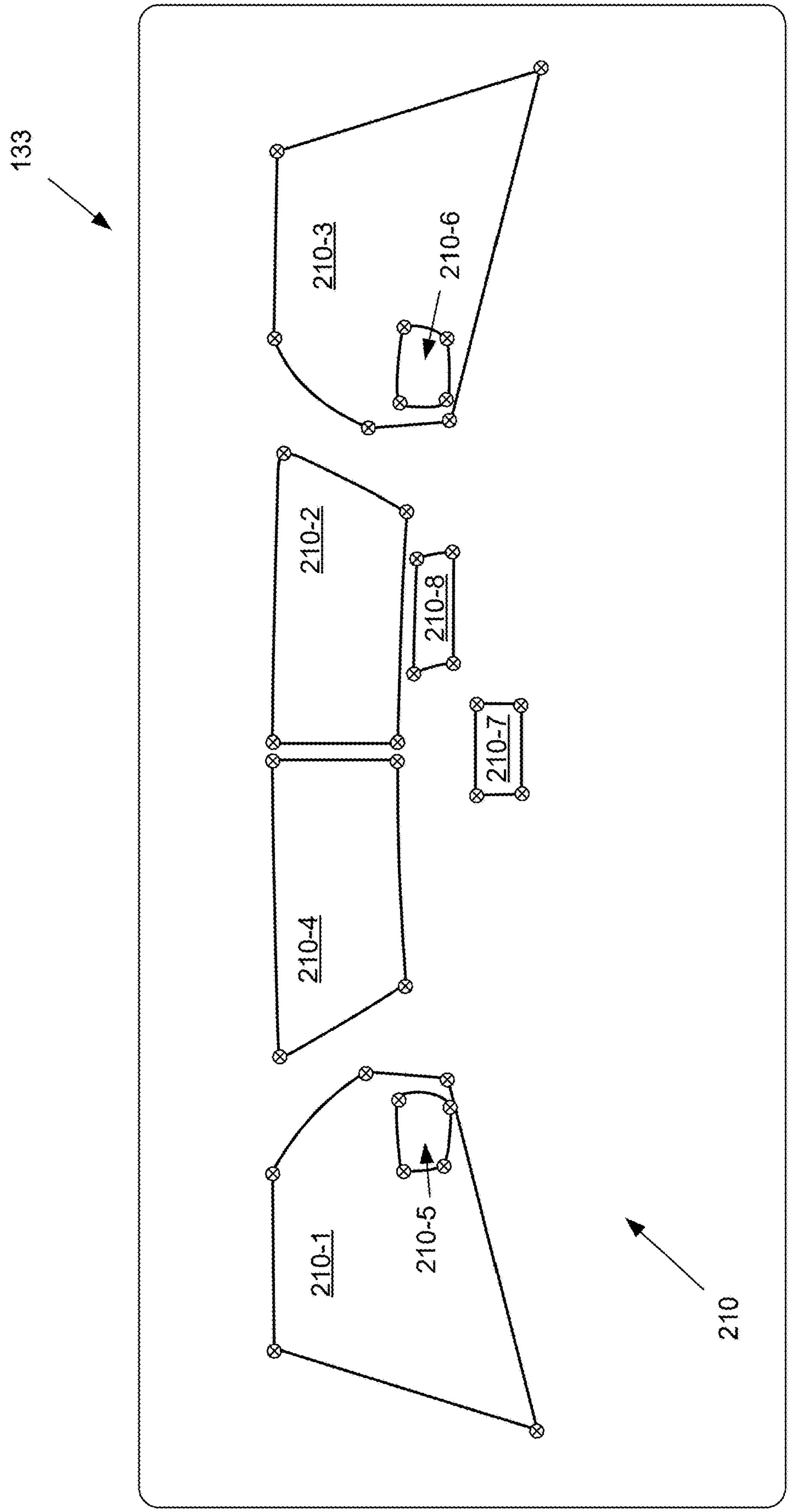

FIG. 2C provides an illustration of those selected surface ROIs 210 of the interior space with respect to their relative locations and positions as indicated by the interior geometry specification data 105. In some embodiments, the ROIs 210 may be selected based on their relevance to one or more OMS operations. For example, for a driver gaze detection function, regions of interest may include, but are not limited to, the region of a display console or vehicle controls, regions of a windshield where a heads-up display is projected, etc. In some embodiments, the interior geometry specification data 105 (e.g., the CAD model) may be updated to include annotations of the selected regions of interest 210 (and/or the selected points 220 used to define the selected regions of interest).

For each of the defined ROIs 210, the 3D geometry rendering function 112 may generate point cloud data 114. The point cloud data 114 may include a set of (datum) points created as a grid over the interior surfaces appearing within the selected ROIs 210. Those points may be used to produce a respective 3D cloud point for an individual ROI 210. For example, in some embodiments, the points may be formed by the 3D geometry rendering function 112 based on the vertices of a wireframe mesh of the ROI surface(s) generated from the interior geometry specification data 105. In some embodiments, the points for a set of 3D cloud points may be produced for a region of interest based on projecting a perpendicular plane through the interior vehicle surface (from the interior geometry model) that are bounded within that region of interest. For example, in some embodiments such a perpendicular plane may be generated using one or more tools of a 3D rendering application from the interior geometry model. The 3D cloud points of interior point cloud data 114 may be generated for an ROI 210 by periodically sampling points along the curve of the intersection between the modeled interior vehicle surface and the perpendicular plane, and sweeping the perpendicular plane across the region of interest to obtain a distribution of such periodic sampling points across the surface bounded within the region of interest to form a uniform grid of points, or 3D point cloud, over the surface.

Figure 3A:
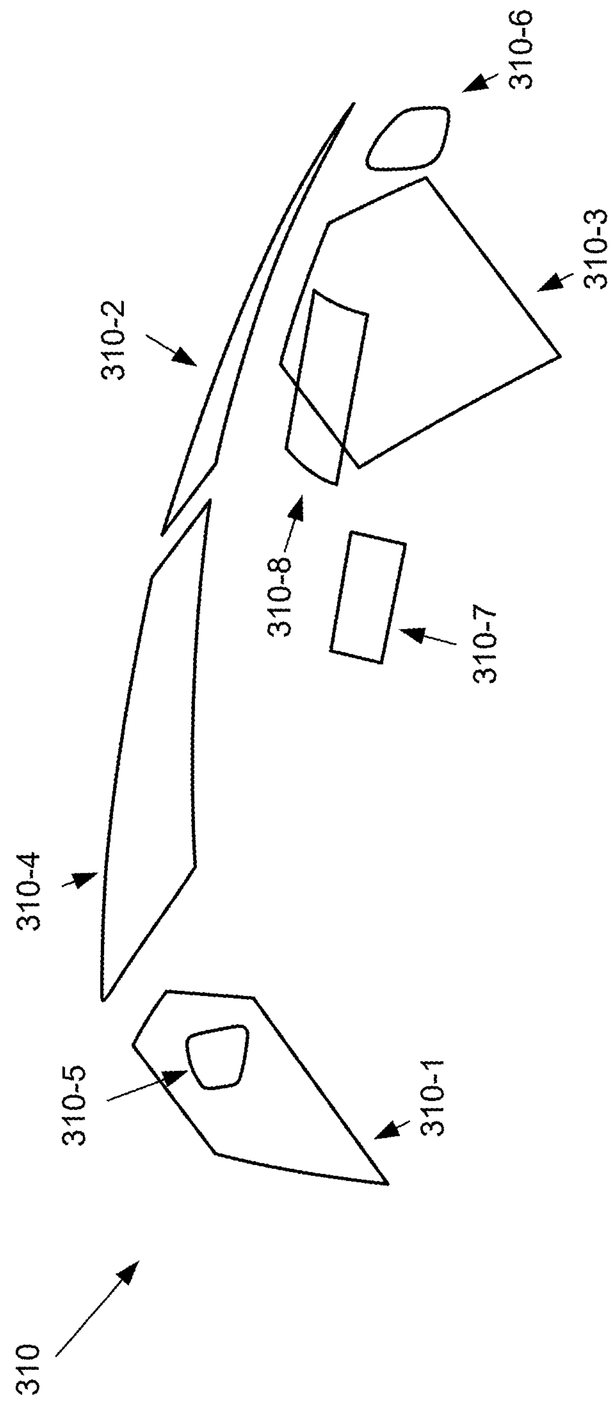
FIGS. 3A, 3B, 3C and 3D illustrate the generation of 3D point clouds and 3D co-oriented bounding shapes from the selected regions of interest and 3D polygonal region surface model corresponding to region of interest surfaces.
Figure 3B:
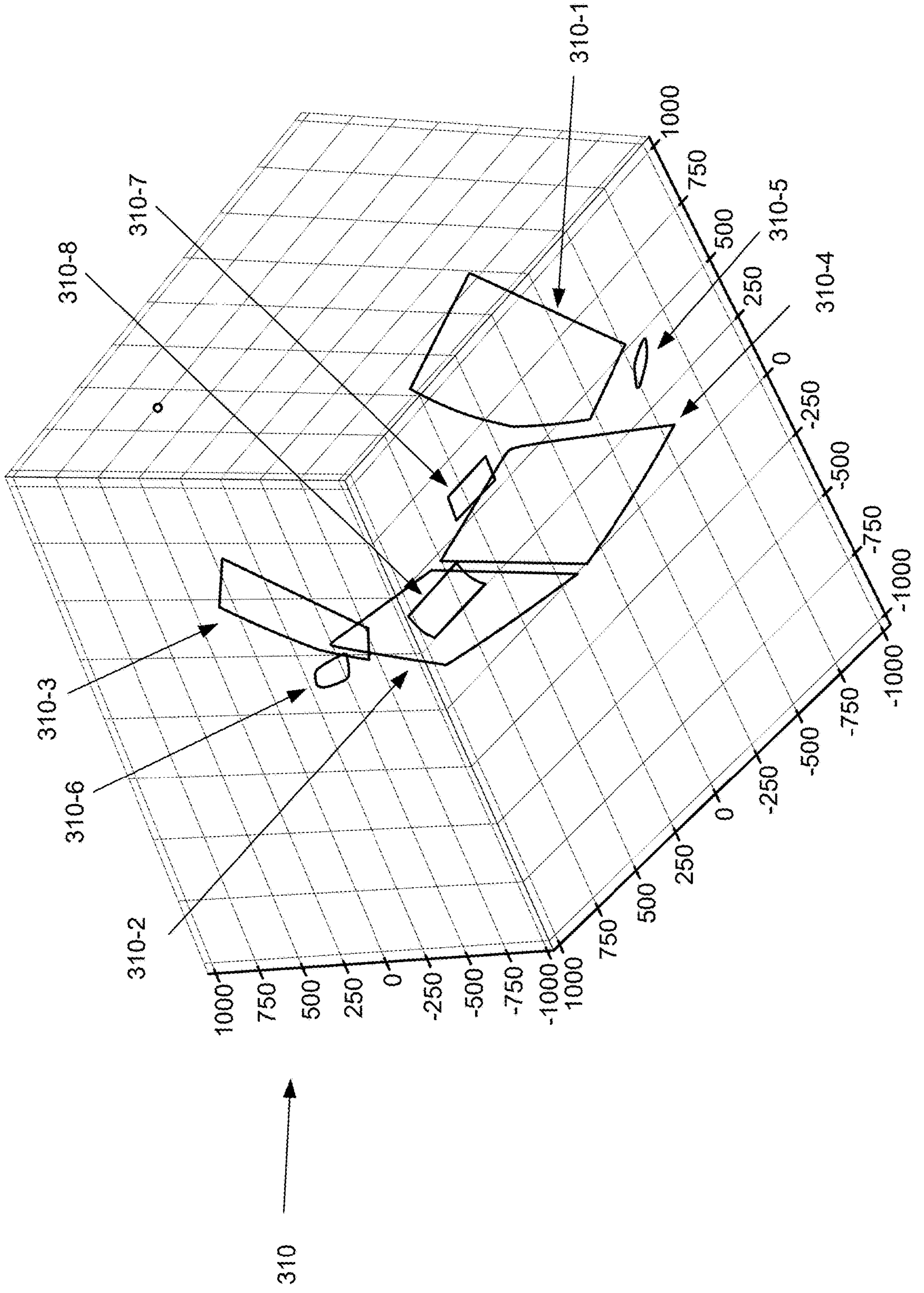
Figure 3C:
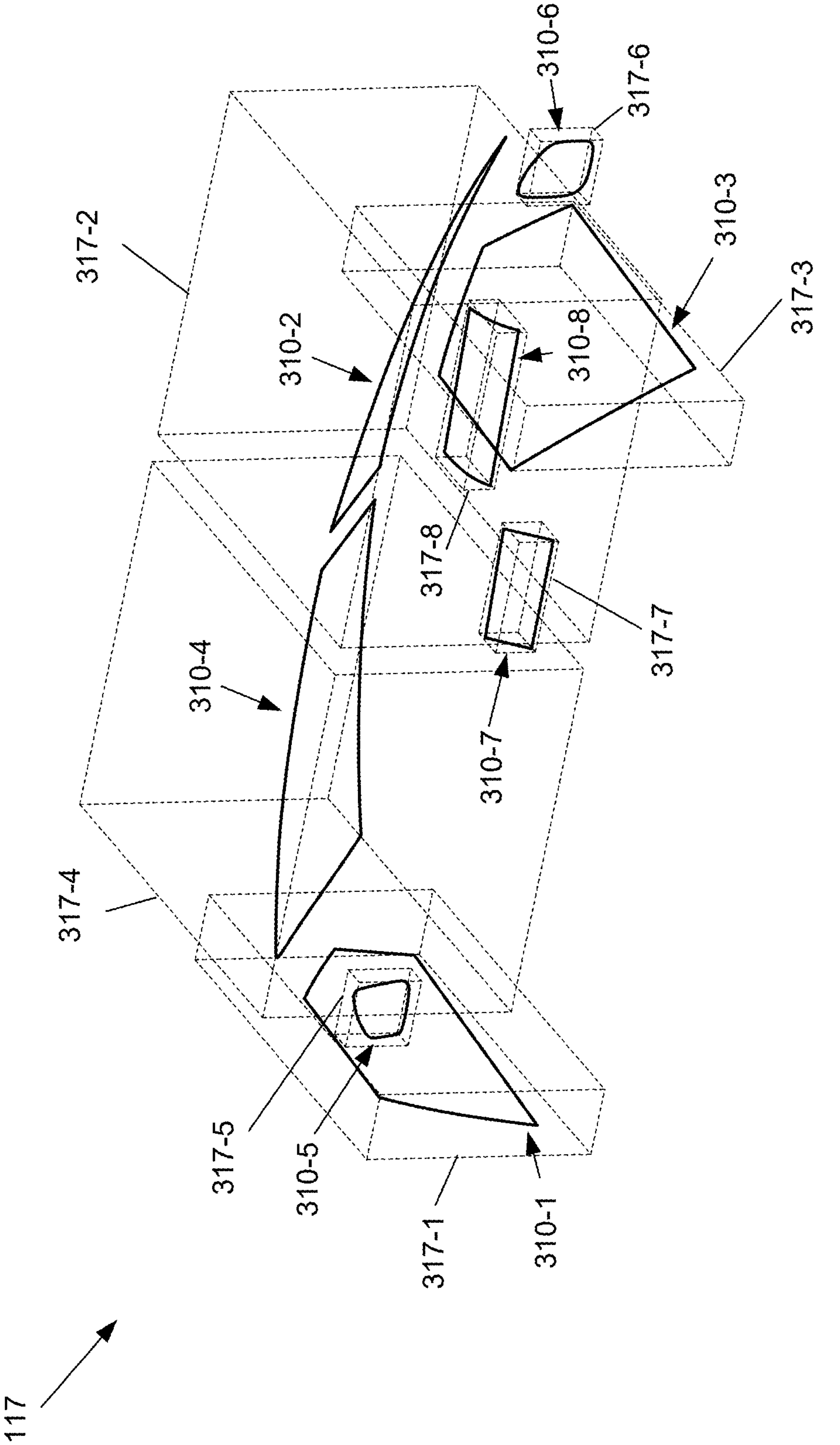

Further referring to FIG. 1, the interior point cloud data 114 may be applied to a bounding shape (e.g., bounding box) generator 116. With 3D point clouds for the selected ROIs 210 established, a respective 3D bounding shape may be generated around the 3D point cloud, where the 3D bounding shape bounds the volume around the 3D point cloud for an ROI 210. For example, FIGS. 3A and 3B illustrate a set of 3D point clouds 310 (e.g., represented by point cloud data 114), where individual 3D point clouds 310-1 to 310-8 may respectively correspond to the individually selected ROIs 210-1 to 210-8 illustrated in FIG. 2C. The bounding shape generator 116 may compute and output a set of 3D co-oriented bounding shapes 117 comprising individual bound shapes (shown in FIG. 3C as bounding shapes 317-1 to 317-8) formed from the plurality of 3D point clouds associated with selected ROIs 210.

As previously mentioned, the 3D bounding shapes 317 may be generated as co-oriented bounding shapes (e.g., along at least one axis). That is, an individual 3D bounding shape 317 may be aligned based on a set of three mutually orthogonal vectors (axes) that define a local coordinate system with respect to the bounded 3D point cloud. Those mutually orthogonal vectors of one 3D bounding shape 317 may be aligned with the mutually orthogonal vectors for at least one (e.g., each) of the other individual 3D bounding shapes 317 so that the resulting set of 3D bounding shapes 117 may share a common Euclidean 3D coordinate framework. In some embodiments, the shared coordinate framework may be based on a reference frame of the interior geometry model (e.g., aligned to a coordinate system of the vehicle interior—which may be defined by the interior geometry specification data 105), a vehicle defined reference frame, or other selected reference frame. As such, the resulting set of bounding shapes establish a framework that may be translated to a reference frame of a three-dimensional (3D) reconstruction of the vehicle's interior geometry. That is, using the geometry model represented by interior geometry specification data 105, a first set of datum points representing at least a first region of one or more surfaces, and a second set of datum points representing at least a second region of the one or more surfaces may be computed. A first 3D bounding shape that bounds the first set of points may be generated, and a second 3D bounding shape that bounds the second set of points may be generated, wherein the first 3D bounding shape and the second 3D bounding shape are co-oriented.

Based on the set of 3D co-oriented bounding shapes 117, the geometry reconstruction processing platform 110 may execute one or more algorithms to perform bounded point cloud surface projection(s) 118 to produce 3D polygonal region surface model data 120. That is, for an individual 3D bounding shape 117, the bounded point cloud surface projection 118 may perform a surface fitting of the cloud points within that 3D bounding shape to generate a 3D polygonal region surface model corresponding to the surface within the associated ROI 210. From within an oriented bounding shape 317, a bounded set of point cloud samples may be projected using a surface fitting algorithm (e.g., fitted using a convex hull algorithm) onto a curved surface of a non-circumscribed polygon in three dimensions to generate a region surface model associated with that interior surface ROI (e.g., as illustrated in FIG. 3D).

Figure 3D:
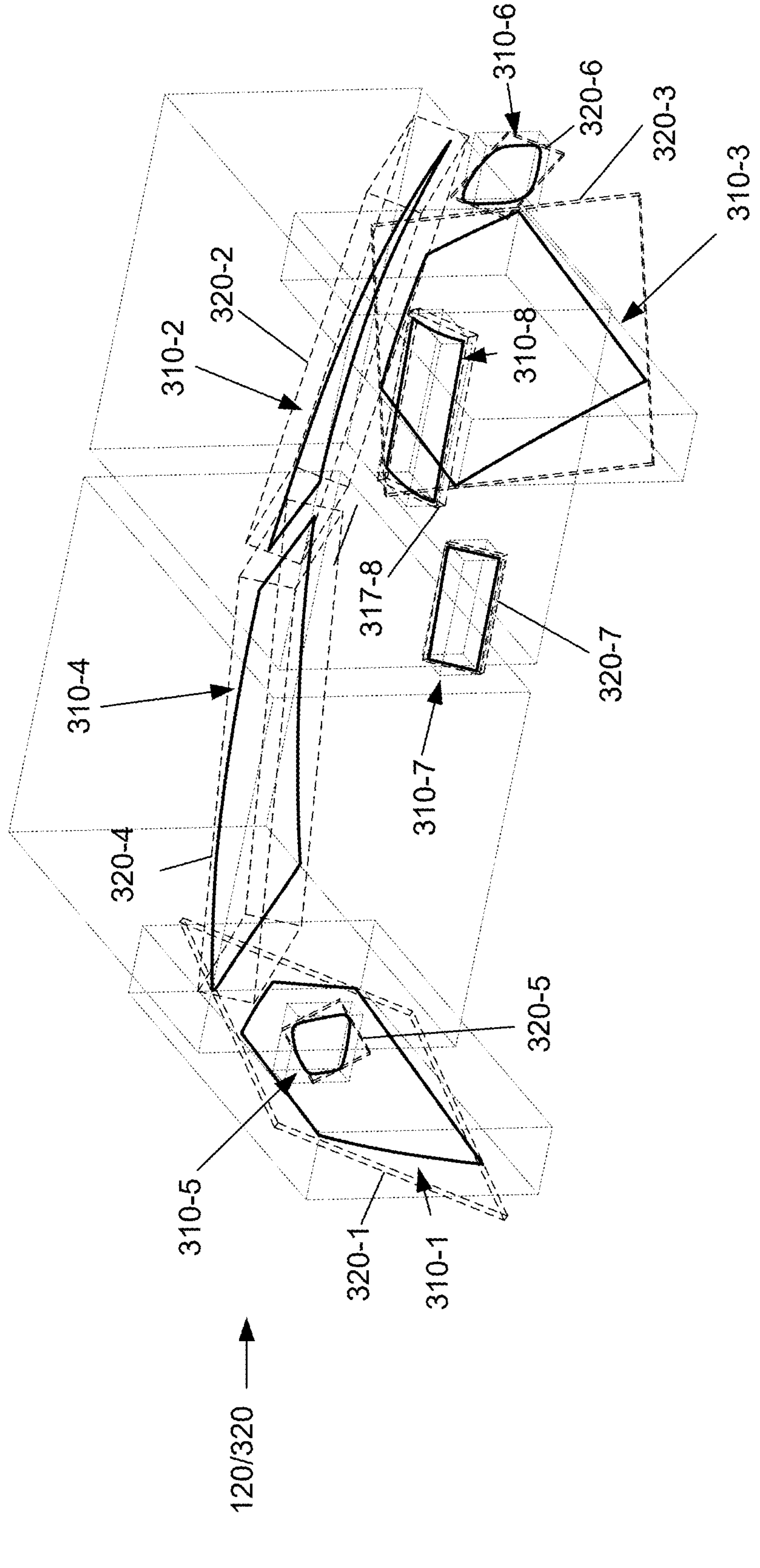

For example, as shown in FIG. 3D, a 3D polygonal region surface model data 120 may be generated from the bounded point cloud surface projection(s) 118 within an oriented bounding shape 317 by fitting a convex hull around the point cloud sample within the oriented bounding shape 317 to derive a respective 3D polygonal region surface model, shown as 3D polygonal region surface models 320-1 to 320-8. A resulting 3D polygonal region surface model 320 comprises a 3D approximation of the surface for the associated ROI 210. The resulting fitted surface provided by a 3D polygon region surface model 320 (e.g., models 320-1 to 320-8) may be used to model a surface of the vehicle interior—where points on a 3D polygonal region surface model 320 correspond to respective points on the vehicle interior surface. In some embodiments, the resulting set of 3D polygonal region surface models 320 (e.g., 3D polygonal region surface model data 120) may be saved as coordinates using a data structure such as, but not limited to, a JavaScript Object Notation (JSON) data structure.

Points on the 3D polygonal region surface models 320 corresponding to the selected ROIs 210 may be transformed back to a same shared coordinate framework via the co-oriented bounding shapes (without needing extrinsic calibration and/or rotation-translation transforms) to form a 3D interior geometry reconstruction 140 based on the 3D polygonal region surface model data 120. Accordingly, the 3D coordinates of a point of a 3D polygon surface model for one region of interest may be readily correlated by the 3D interior geometry reconstruction 140 to a 3D polygon surface model of any of the other regions of interest. Moreover, the entire system of 3D polygonal region surface models represented by the 3D polygonal region surface model data 120 may be readily oriented using a rotation-translation transform to conform to any convenient coordinate system to produce the 3D interior geometry reconstruction 140 representing the vehicle interior (or other interior space defined by the interior geometry specification data 105). In some embodiments, the 3D interior geometry reconstruction 140 may be aligned (e.g., using a rigid transformation for rotation and translation) to a global coordinate system associated with the monitored interior environment (e.g., a factory coordinate space) to determine 3D coordinates for an observed feature in the global coordinate system. The reference coordinate system can be freely defined by subject domain experts, and can be connected to an occupant monitoring camera via extrinsic calibration parameters (e.g., a rotation matrix and translation vector).

In some embodiments, the 3D interior geometry reconstruction 140 can be readily augmented by adding one or more additional regions of interest. As was the case for the initial set of regions of interest, a new region of interest may be defined by selecting a set of interior surface locations from the interior geometry model (interior geometry specification data 105) to define a closed polygon. The interior geometry model may be used to present a rendering of the interior geometry presentation 113 permitting the selection of points (e.g., by a user and/or selection algorithm) to form a boundary around the new region of interest. As an example, the new region of interest may include a passenger side glove box. By selecting three or more surface points of the glove box from the rendering of the vehicle interior, a new region of interest may be defined as the regions within the closed polygon formed by those points. A set of datum points may be generated as a grid over the interior surfaces appearing within the selected closed polygon, which may be used as a set of 3D cloud points, and a 3D bounding shape (co-oriented with the previously defined bounding shapes) may be generated around that 3D point cloud, as discussed above. Within the oriented bounding box, the bounded set of point cloud samples may be projected (e.g., fitted using a convex hull algorithm) onto a curved surface of a non-circumscribed polygon in three dimensions to generate a 3D polygon surface model associated with that new region of interest.

Figure 4:
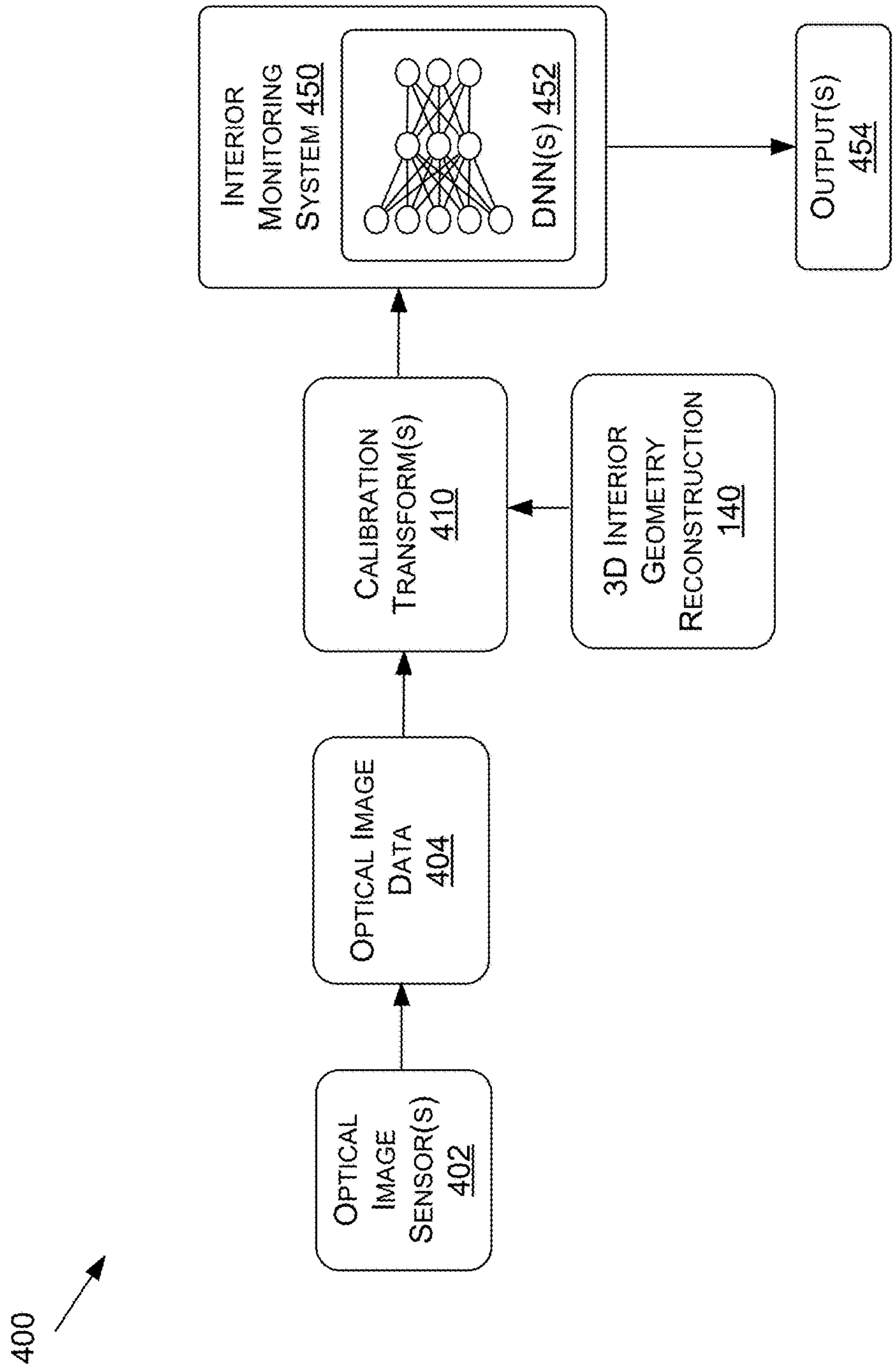
FIG. 4 is a data flow diagram illustrating an example environment monitoring system based on a 3D interior geometry reconstruction developed in accordance with some embodiments of the present disclosure.

Referring now to FIG. 4, FIG. 4 is a data flow diagram illustrating an example environment monitoring system 400, in accordance with some embodiments of the present disclosure. In this example, an interior monitoring system 450 may receive image data 404 comprising a plurality of image data streams (e.g., streaming video data) from one or more optical image sensors 402 having a view of the monitored environment. As discussed herein, the one or more optical image sensors 402 may be distributed throughout a monitored environment (e.g., a vehicle interior), and may be extrinsically calibrated via calibration transforms 410 to a coordinate frame of the interior space based on the 3D interior geometry reconstruction 140. The optical image sensors 402 may comprise cameras or other image sensors such as, but not limited to, red, blue, and green (RGB) camera sensors, infrared (IR) camera sensors, RGB-IR sensors, monochrome sensors, and/or other types of image sensors (e.g., that capture a field of view as one or more image frames), and/or combinations thereof. In some embodiments, image sensor(s) 402 may include, for example, RGB, IR, RGB-IR cameras, and/or other cameras, such as cameras described with respect to the vehicle 700 of FIGS. 7A-7D. The image sensor(s) 405 may include one or more cameras of an ego object or ego actor, such as stereo camera(s) 768, wide-view camera(s) 770 (e.g., fisheye cameras), infrared camera(s) 772, surround camera(s) 674 (e.g., 360° cameras), occupant monitoring system (OMS) sensor(s) 701, and/or long-range and/or mid-range camera(s) degree 798 of the autonomous vehicle 700 of FIGS. 7A-7D. The calibration transforms 410 derived from the 3D interior geometry reconstruction 140 permit two-dimensional coordinate translations between images captured by different optical image sensors 402. With an extrinsic calibration transformation (using sensor calibration transforms 410) applied to the output of an optical sensor, the location of a feature (e.g., person, object, etc.) observable from the frame of view of one optical sensor can be mapped to the location on an image frame captured by other optical sensors that also are able to observe the feature. Moreover, in some embodiments, the 3D position of the feature may be computed (and/or tracked over time) based on triangulation into the coordinate frame of the 3D interior geometry reconstruction 140. As such, a feature represented in optical image data 404 as captured by one or more of the optical image sensors 402 may be identified and its position thus established in the global 3D coordinate system of the monitored environment.

For example, in embodiments where images of the vehicle cabin interior are being captured using a front cabin monitoring camera of the optical image sensor(s) 402, the shared coordinate system for the 3D interior geometry reconstruction 140 may be calibrated (e.g., using calibration transform(s) 410 as a rotation-translation transform) to the position and/or extrinsic calibration parameters of the front cabin monitoring camera to establish a 3D point of origin for referencing the 3D coordinates of any surface point within any of the regions of interest 210. Based on images captured by the sensor 402, a precise distance, azimuth, and elevation can be assigned in the camera's frame of reference (or any other selected frame of reference) for every single point on each of those surfaces.

In some embodiments, the regions of interest 210 may represent gaze regions used in conjunction with a driver gaze detection system of the interior monitoring system 450. Based at least in part on the optical image data 404, the interior monitoring system 450 (which may implement one or more components of the OMS) may generate one or more output(s) 454. Output(s) 454 may be generated using one or more machine learning models and/or deep neural networks (DNNs) 452. For example, a machine learning-based gaze detection model may be trained to use captured image data 404 to predict a direction of a gaze vector originating from the eyes of the driver and/or to predict the presence, location, and/or pose of occupants within the space of a vehicle interior. For example, interior monitoring system 450 may comprise a machine learning-based gaze detection model trained to use captured image data to predict a direction of a gaze vector originating from the eyes of the driver. The driver gaze detection system may compute an intersection of the gaze vector with a location on a 3D polygon surface model associated with an interior surface within one of the regions of interest, and based on the point of intersection with the 3D polygon surface model, the driver gaze detection system may compute the 3D coordinates of the location in the shared coordinate system, which may be mapped (e.g., using a rotation-translation transform) to the coordinate system of the OMS camera and/or frame of reference used by the driver gaze detection system (e.g., to determine precisely what the driver is looking at).

Other systems of the vehicle 700 may determine one or more actions to take based on the predictions and/or may control other tasks or operations. For example, based on output(s) 454, an alarm or warning may be generated, door locks and/or windows may be operated, various functions may be turned on/off, data for a digital assistant, chatbot, digital avatar, and/or the like may be generated, and/or air conditioning or air circulation functions may be operated. The output(s) 454 may be used for drowsiness detection OMS functions, drowsiness user adaptation for drowsiness detection OMS functions, diagnostic functions such as detecting sensor blockages and/or mispositioned OMS cameras, and/or other operations to control one or more aspects of vehicle 700. For example, in some embodiments, airbag deployments, driver monitoring systems, occupant recognition, human-machine interface (HMI) applications, and/or other vehicle functions may be controlled based at least on data derived from the optical image data 404 and/or 3D interior geometry reconstruction 140.

Figure 5:
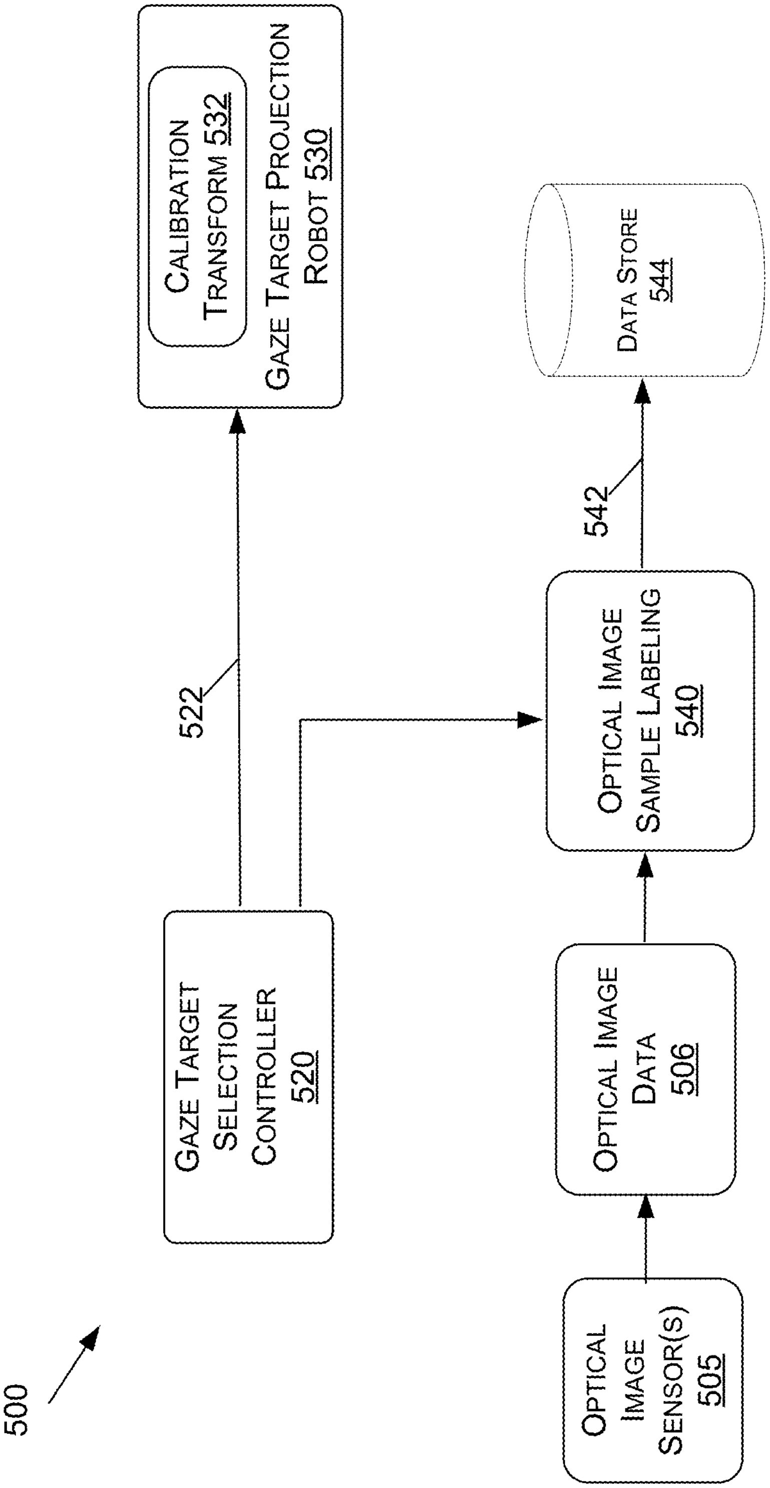
FIG. 5 is a data flow diagram illustrating a process for generating ground truth training data, in accordance with some embodiments of the present disclosure.

In other use cases, a projection system used within an interior space for generating ground truth training data may be calibrated to the shared coordinate system for the 3D interior geometry reconstruction 140. For example, a system for generating ground truth training data for a gaze detection model may comprise a robot that is controlled to project a point of light (a gaze target) onto a specified surface of a vehicle interior while a camera (e.g., an OMS camera) captures images of the face of a test subject in the driver's seat gazing at the point of light. FIG. 5 provides an example of such a system 500 for generating ground truth training data. In FIG. 5, a gaze target projection robot 530 may be controlled by a gaze target selection controller 520. The robot 530 may be calibrated to the shared coordinate system of 3D interior geometry reconstruction 140 (e.g., using a calibration transform 532 based on 3D interior geometry reconstruction 140) and provided 3D coordinates 522 by the gaze target selection controller 520 for a point on a surface of the interior space where the point of light should appear. In some embodiments, the 3D coordinate 522 may indicate a target coordinate located within one of the ROIs 210 used in the generation of the 3D interior geometry reconstruction 140. As such, the extrinsic relationship between the reference coordinate system of the 3D interior geometry reconstruction 140 and the robot is known. The robot 530 may translate the 3D coordinates 522 into a local azimuth and elevation coordinate, and control its projector to point in the direction of that local azimuth and elevation coordinate while projecting a light beam—thus producing the point of light at the desired 3D coordinate on the interior surface. The relationship between the reference coordinate system of the 3D reconstruction and the robot is known. An optical image sensor 505 (e.g., one or more cameras) observing a vehicle occupant's face may capture optical image data 506 representing, for example, one or more images that depict an angle of eye and/or face rotation occurring at the time the occupant is directing their gaze at the point of light projected by the robot 530. Those images may be labeled (as shown at 540) based on the known 3D coordinates selected by the gaze target selection controller 520 and used to aim the robot 530 to produce a ground truth data sample 542. The labeled ground truth data sample 542 may be stored (e.g., to a data store 544) and/or used, for example, for machine learning model training and/or verification or other purposes.

In some embodiments, an OMS camera may itself be a feature having a position defined by the interior geometry specification data 105. In this case, the OMS camera module itself can serve as a reference point to set the 3D coordinate system origin and pose. The orientation of the bounding shapes formed from the point clouds, as well as coordinate points on the surfaces of the vehicle interior, may be represented with respect to this reference to the known position of the OMS camera. Moreover, relationships to points on the interior surface regions may be translated to the local frame of reference for one or more other interior sensors based on establishing the extrinsic calibration between those other sensors and the OMS camera via the 3D interior geometry reconstruction 140. In some embodiments, the interior geometry specification data 105 may not indicate the position of an OMS camera. In this case, a visual fiducial system pattern mounted on the camera may be used as an invariant visual reference and used to extrinsically calibrate the camera with a reference region (e.g., one of the one or more regions of reference)—or more particularly to a 3D polygonal region surface model 320 derived for an ROI 210 for a region where the camera is mounted. Since that 3D polygonal region surface model 320 shares the common coordinate system with the other 3D polygonal region surface models used for the 3D interior geometry reconstruction 140, the camera will be further extrinsically calibrated with the coordinate system of the 3D reconstruction.

Figure 6:
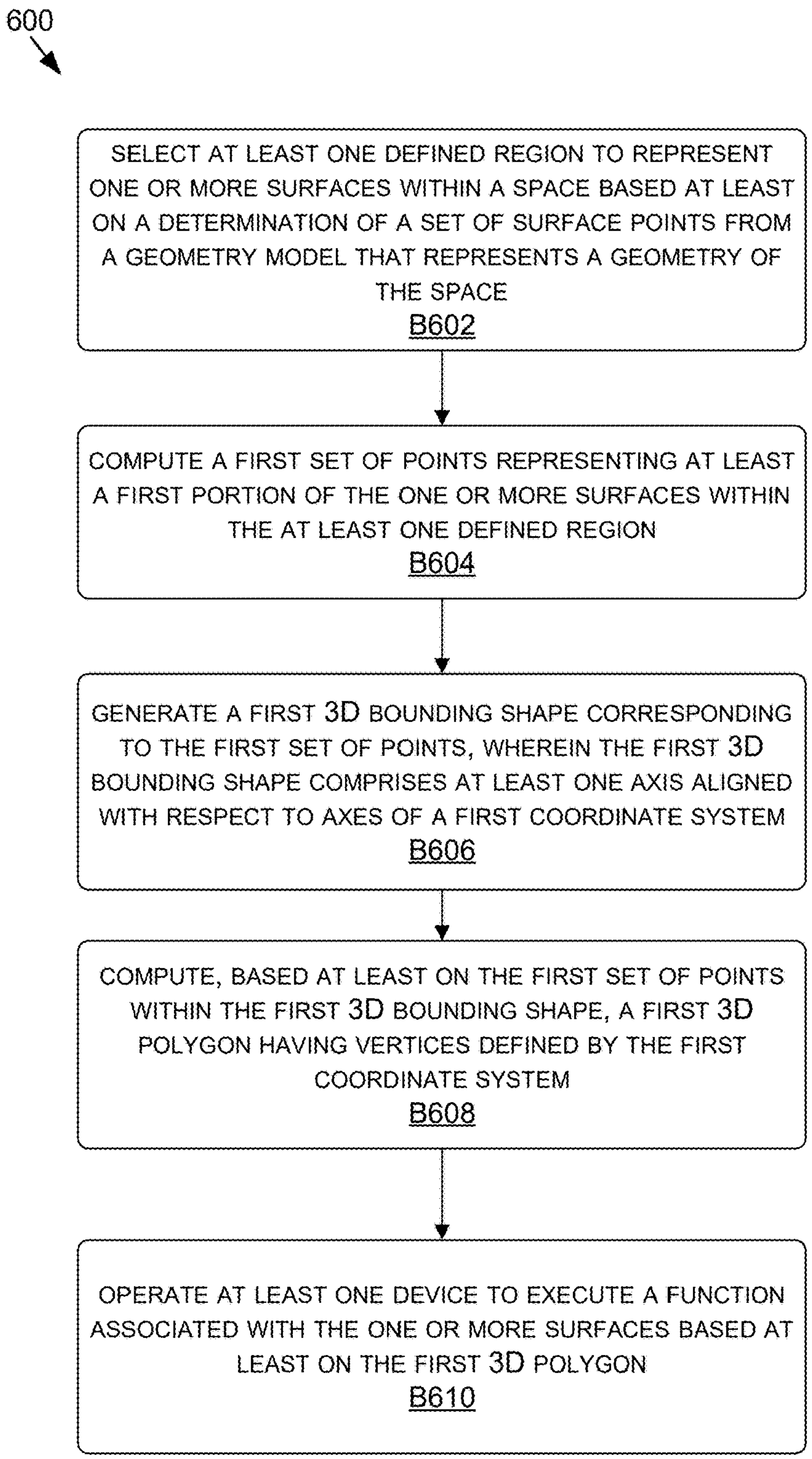
FIG. 6 is a flow diagram showing a method for 3D interior geometry reconstruction in accordance with some embodiments of the present disclosure.

Now referring to FIG. 6, FIG. 6 is a flow diagram showing a method 600 for 3D interior geometry reconstruction in accordance with some embodiments of the present disclosure. It should be understood that the features and elements described herein with respect to the method 600 of FIG. 6 may be used in conjunction with, in combination with, or substituted for elements of any of the other embodiments discussed herein and vice versa. Further, it should be understood that the functions, structures, and other descriptions of elements for embodiments described in FIG. 6 may apply to like or similarly named or described elements across any of the figures and/or embodiments described herein and vice versa.

Each block of method 600, described herein, comprises a computing process that may be performed using any combination of hardware, firmware, and/or software. For instance, various functions may be carried out by one or more processors (e.g., one or more processing units comprising processing circuitry) executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 600 is described, by way of example, with respect to the 3D interior geometry reconstruction system 100 and/or geometry reconstruction processing platform 110 of FIG. 1. However, these methods may additionally or alternatively be executed by any one system, or any combination of systems, including, but not limited to, those described herein.

As discussed herein in greater detail, the method may in general include generating one or more 3D polygons representing one or more surfaces within a space based at least on generating points from a geometry model, the points representing one or more regions of the one or more surfaces, and surface fitting one or more bound sets of the points to form the one or more 3D polygons, wherein the one or more bound sets are individually associated with a region of the one or more regions and individually bound based on a bounding shape aligned to a shared 3D coordinate system; and operating at least one device to execute a function associated with the one or more surfaces based at least on the one or more 3D polygons.

The method 600, at block B602, includes selecting at least one defined region to represent one or more surfaces within a space based at least on a determination of a set of surface points from a geometry model that represents a geometry of the space. In some embodiments, the method may render a representation of the one or more surfaces on a display screen of a human-machine interface based at least on the geometry model, wherein the determination of the set of surface points is based at least in part on inputs received via the human-machine interface.

For example, as shown in FIG. 1, the geometry reconstruction processing platform 110 comprises a 3D geometry rendering function 112 that may input the interior geometry specification data 105 and render an interior geometry presentation 113 for the interior space that may be presented via a human-machine interface (HMI) 130. By interacting with the HMI 130, a user may select one or more surfaces observable from display 200 as regions of interest (ROIs). In some embodiments, one or more surfaces may be selected as ROIs by a surface selection algorithm (e.g., a machine learning model) executed by geometry reconstruction processing platform 110 instead of, or in addition to, selection of ROIs by a human user via an HMI 130. A region of interest may be defined by selecting a set of interior surface locations from the interior geometry model to define a closed region (e.g., a closed polygon). In some embodiments, one or more additional regions of interest may be defined by selecting a set of interior surface locations from the interior geometry model to define closed regions. In some embodiments, the regions of interest are selected based on their relevance to one or more OMS operations. For example, for a driver gaze detection function, regions of interest may include, but are not limited to, the region of a display console or vehicle controls, regions of a windshield where a heads-up display is projected, etc.

The method 600, at block B604, includes computing a first set of points representing at least a first region (e.g., portion) of the one or more surfaces within the at least one defined (e.g., closed) region.

For each of the defined ROIs, the 3D geometry rendering function 112 may generate interior point cloud data 114 comprising a set of datum points created as a grid over the interior surfaces appearing within the selected closed ROIs, and which may be used as a set of 3D cloud points. For example, in some embodiments, the datum points may be formed by the 3D geometry rendering function 112 based on the vertices of a wireframe mesh of the ROI surface(s) generated from the interior geometry specification data 105. In some embodiments, the datum points for a set of 3D cloud points may be produced for a region of interest based on projecting a perpendicular plane through the interior vehicle surface (from the interior geometry model) that is bounded within that region of interest. In some embodiments, a perpendicular plane may be generated using one or more tools of a 3D rendering application from the interior geometry model. The 3D cloud points of interior point cloud data 114 may be generated by periodically sampling points along the curve of the intersection between the modeled interior vehicle surface and the perpendicular plane, and sweeping the perpendicular plane across the region of interest to obtain a distribution of such periodic sampling points across the surface bounded within the region of interest to form a uniform grid of points, or 3D point cloud, over the surface.

The method 600, at block B606, includes generating a first 3D bounding shape corresponding to the first set of points (e.g., that bounds the first set of datum points representing at least the first region), wherein the first 3D bounding shape comprises at least one axis aligned with respect to axes of a first coordinate system. For example, the first coordinate system may be based on at least one of: a frame of reference of the geometry model, a frame of reference associated with a vehicle interior, and a frame of reference associated with a position of the at least one device. The first 3D bounding shape may comprise, for example, a bounding box having one or more sides aligned with the axes of the first coordinate system. For example, as previously discussed, a bounding shape generator 116 may compute and output a set of 3D co-oriented bounding shapes 117 comprising individually bound shapes (shown in FIG. 3C as bounding shapes 317-1 to 317-8) formed from the plurality of 3D point clouds associated with selected ROIs 210. The 3D bounding shapes 317 may be generated as co-oriented bounding shapes. That is, an individual 3D bounding shape 317 may be aligned based on a set of three mutually orthogonal vectors (axes) that define a local coordinate system with respect to the bounded 3D point cloud. Those mutually orthogonal vectors of one of the 3D bounding shapes 317 may be aligned with the mutually orthogonal vectors for each of the other individual 3D bounding shapes 317 so that the resulting set of 3D bounding shapes 117 may all share a common Euclidean 3D coordinate framework. In some embodiments, the shared coordinate framework may be based on a reference frame of the interior geometry model (e.g., aligned to a coordinate system of the vehicle interior—which may be defined by the interior geometry specification data 105), a vehicle defined reference frame, or other selected reference frame. As such, the resulting set of bounding shapes establishes a framework that may be translated to a reference frame of a three-dimensional (3D) reconstruction of the vehicle's interior geometry.

The method 600, at block B608, includes computing, (e.g., using a surface fitting algorithm, for example and without limitation) and based at least on the first set of points within the first 3D bounding shape, a first 3D polygon having vertices defined by the first coordinate system. In some embodiments, the method computes the first 3D polygon using the surface fitting algorithm based on a convex hull algorithm. Based on the set of 3D co-oriented bounding shapes 117, the geometry reconstruction processing platform 110 may execute one or more algorithms to perform bounded point cloud surface projection(s) 118. That is, for an individual 3D bounding shape 117, the bounded point cloud surface projection 118 may perform a surface fitting of the cloud points within a 3D bounding shape to generate a 3D polygon (that is, a 3D polygonal region surface model 320) corresponding to the surface within the associated ROI 210.

From within an oriented bounding shape 317, a bounded set of point cloud samples may be projected using a surface fitting algorithm (e.g., fitted using a convex hull algorithm) onto a curved surface of a non-circumscribed polygon in three dimensions to generate a region surface model associated with that interior surface ROI (e.g., as illustrated in FIG. 3D). A 3D polygonal region surface model 320 may be generated from the bounded point cloud surface projection(s) 118 within an oriented bounding shape 317 by fitting a convex hull around the point cloud sample within the oriented bounding shape 317 to derive a 3D polygonal region surface model 320. A resulting 3D polygonal region surface model 320 comprises a 3D approximation of the surface for the associated ROI 210. The resulting fitted surface provided by 3D polygon region surface model 320 may be used to model a surface of the vehicle interior—where points on a 3D polygonal region surface model 320 correspond to respective points on the vehicle interior surface. In some embodiments, the resulting set of 3D polygonal region surface models 320 (e.g., 3D polygonal region surface model data 120) may be saved as coordinates using a data structure such as, but not limited to, a JavaScript Object Notation (JSON) data structure.

In some embodiments, the method may compute one or more extrinsic calibration parameters for the at least one device based at least on the first coordinate system. A 3D reconstruction may be generated (e.g., rendered) representing the space based at least on the first 3D polygon and the second 3D polygon. The method may thus proceed with calibrating one or more extrinsic parameters of the at least one device with a coordinate system based at least on the first 3D polygon and the second 3D polygon. For example, points of one or more of the 3D polygonal region surface models 320 for the selected ROIs 210 may be transformed back to a same shared coordinate framework via the co-oriented bounding shapes (without needing extrinsic calibration and/or rotation-translation transforms) to form a 3D interior geometry reconstruction 140. Accordingly, the 3D coordinates of a point of a 3D polygon surface model for one region of interest may be readily correlated by the 3D interior geometry reconstruction 140 to a 3D polygon surface model of any of the other regions of interest. Moreover, the entire system of 3D polygonal region surface models 320 may be readily oriented using a rotation-translation transform to conform to any convenient coordinate system to produce the 3D interior geometry reconstruction 140 representing the vehicle interior (or another interior space defined by the interior geometry specification data 105). In some embodiments, the 3D interior geometry reconstruction 140 may be aligned (e.g., using a rigid transformation for rotation and translation) to a global coordinate system associated with the monitored interior environment (e.g., a factory coordinate space) to determine 3D coordinates for an observed feature in the global coordinate system. The reference coordinate system can be freely defined by subject domain experts, and can be connected to an occupant monitoring camera via extrinsic calibration parameters (e.g., a rotation matrix and translation vector).

The method 600, at block B610, includes operating at least one device to execute a function associated with the one or more surfaces based at least on the first 3D polygon. For example, the method may determine a 3D coordinate in the first coordinate system for at least one point on the one or more surfaces based at least on the first 3D polygon and image data for the space captured by the at least one device. In some embodiments, the function is based at least on a determination of a 3D coordinate for a point on the one or more surfaces within the first 3D polygon or the second 3D polygon. For example, as discussed with respect to FIG. 4, an interior monitoring system 450 may receive image data 404 comprising a plurality of image data streams (e.g., streaming video data) from one or more optical image sensors 402 having a view of the monitored environment. As discussed herein, the one or more optical image sensors 402 may be distributed throughout a monitored environment (e.g., a vehicle interior), and extrinsically calibrated via calibration transforms 410 to a coordinate frame of the interior space based on the 3D interior geometry reconstruction 140. With an extrinsic calibration transformation (using sensor calibration transforms 410) applied to the output of an optical sensor, the location of a feature (e.g., person, object, etc.) observable from the frame of view of one optical sensor can be mapped to the location on an image frame captured by other optical sensors that also are able to observe the feature. Moreover, in some embodiments, the 3D position of the feature may be computed (and/or tracked over time) based on triangulation into the coordinate frame of the 3D interior geometry reconstruction 140. As such, a feature represented in optical image data 404 as captured by one or more of the optical image sensors 402 may be identified and its position thus established in the global 3D coordinate system of the monitored environment.

In some embodiments, the first coordinate system is based at least on a frame of reference determined based at least on a position of the at least one device, and extrinsic calibration parameters of the at least one device. For example, an OMS camera may itself be a feature having a position defined by the interior geometry specification data 105. In this case, the OMS camera module itself can serve as a reference point to set the 3D coordinate system origin and pose. The orientation of the bounding shapes formed from the point clouds, as well as coordinate points on the surfaces of the vehicle interior, may be represented with respect to this reference to the known position of the OMS camera. Moreover, relationships to points on the interior surface regions may be translated to the local frame of reference for one or more other interior sensors based on establishing the extrinsic calibration between those other sensors and the OMS camera via the 3D interior geometry reconstruction 140. In some embodiments, the interior geometry specification data 105 may not indicate the position of an OMS camera. In this case, a visual fiducial system pattern mounted on the camera may be used as an invariant visual reference and used to extrinsically calibrate the camera with a reference region (e.g., one of the one or more regions of reference)—or more particularly to 3D polygonal region surface model 320 derived for an ROI 210 for a region where the camera is mounted. Since that 3D polygonal region surface model 320 shares the common coordinate system with the other 3D polygonal region surface models used for the 3D interior geometry reconstruction 140, the camera will be further extrinsically calibrated with the coordinate system of the 3D reconstruction.

In some embodiments, the method may determine a 3D coordinate of an intersection of a gaze vector with the first 3D polygon based at least on an image of a face captured by the at least one device. As an example, in some embodiments, the regions of interest 210 may represent gaze regions used in conjunction with a driver gaze detection system of the interior monitoring system 450. Based at least in part on the optical image data 404, the interior monitoring system 450 (which may implement one or more components of the OMS) may generate one or more output(s) 454. Output(s) 454 may be generated using one or more machine learning models and/or deep neural networks (DNNs) 452. For example, a machine learning-based gaze detection model may be trained to use captured image data 404 to predict a direction of a gaze vector originating from the eyes of the driver and/or to predict the presence, location, and/or pose of occupants within the space of a vehicle interior. For example, interior monitoring system 450 may comprise a machine learning-based gaze detection model trained to use captured image data to predict a direction of a gaze vector originating from the eyes of the driver. The driver gaze detection system may compute an intersection of the gaze vector with a location on a 3D polygon surface model associated with an interior surface within one of the regions of interest, and based on the point of intersection with the 3D polygon surface model, the driver gaze detection system may compute the 3D coordinates of the location in the shared coordinate system, which may be mapped (e.g., using a rotation-translation transform) to the coordinate system of the OMS camera and/or frame of reference used by the driver gaze detection system (e.g., to determine precisely what the driver is looking at).

The method may further include controlling a robot to orient a pointing device at the one or more surfaces based at least on a 3D coordinate in the first coordinate system. A projection system used within an interior space for generating ground truth training data may be calibrated to the shared coordinate system for the 3D interior geometry reconstruction 140. For example, a system for generating ground truth training data for a gaze detection model may comprise a robot that is controlled to project a point of light (a gaze target) onto a specified surface of a vehicle interior while a camera (e.g., an OMS camera) captures images of the face of a test subject in the driver's seat gazing at the point of light, such as described with respect to FIG. 5. In some embodiments, the method may further compute a second set of datum points representing at least a second region of the one or more surfaces. A second 3D bounding shape may be generated that bounds the second set of datum points representing at least the first region, wherein the second 3D bounding shape comprises at least one axis aligned with the at least one axis of the first 3D bounding shape. The method may compute, using the surface fitting algorithm and based at least on the second set of datum points within the second 3D bounding shape, a second 3D polygon having vertices defined by the first coordinate system, and operating the at least one device to execute the function associated with the one or more surfaces based at least on the first 3D polygon and the second 3D polygon.

In some embodiments, the systems and methods described herein may be performed within, or in conjunction with, a simulation environment (e.g., NVIDIA's DriveSIM) using simulated data (e.g., simulated sensor data of simulated sensors of a virtual or simulated machine). For example, simulated sensor data and/or map data may be used that includes image data captured by a plurality of optical image sensors deployed to monitor an environment, such as a vehicle interior, within the simulation environment—and those optical image sensors are extrinsically calibrated based on a 3D interior geometry reconstruction 140 produced from 3G region surface model data 120, as discussed herein. The simulation environment may use this image data and/or fixed mounted optical image sensor calibration parameter information to perform operations (e.g., navigating) associated with the virtual machine within the environment. These simulated operations may be used to test performance of the underlying algorithms, systems, and/or processes prior to deploying them in the real world. In some instances, the simulation may be used to generate synthetic training data—e.g., training data including regions of interest and/or subregions of interest from within the simulation. The synthetic training data (in addition to or alternatively from real-world data) may then be processed to determine geometry and/or other information related to road surfaces, for example. In any example, such as where a simulation environment is used for testing, validation, training, etc., the simulation environment and/or associated training data may be rendered or otherwise generated using one or more light transport algorithms—such as ray-tracing and/or path-tracing algorithms. In some embodiments, the simulation environment and/or one or more objects, features, or components thereof may be generated or managed within a three-dimensional (3D) content collaboration platform (e.g., NVIDIA's Omniverse) for industrial digitalization, generative physical artificial intelligence (AI), and/or other use cases, applications, or services. For example, the content collaboration platform or system may include a system for using or developing a universal scene descriptor (USD) (e.g., OpenUSD) data for managing objects, features, scenes, etc., within a simulated environment, digital environment, etc. The platform may include real physics simulation, such as using NVIDIA's PhysX SDK, in order to simulate real physics and physical interactions with simulations hosted by the platform. The platform may integrate OpenUSD along with ray tracing/path tracing/light transport simulation (e.g., NVIDIA's RTX rendering technologies) into software tools and simulation workflows for building, training, deploying, or testing AI systems —such as systems for testing, validating, training (e.g., machine learning models, neural networks, etc.), and/or other tasks related to automotive, robot, machine, or other applications.

In some embodiments, teleoperation or remote control of a vehicle or other machine may be performed using a remote control or teleoperation system. For example, the systems and methods described herein may be used to produce processed image data related to animated or static objects, hazards, etc., which may be used or included in a visualization or mapping of an environment to aid a remote operator in controlling—or providing waypoints or other indications of control or navigation—an autonomous or semi-autonomous machine through an environment.

In some embodiments, the system and methods described herein may be deployed in an in-vehicle infotainment (IVI) system or in-cabin experience (IX) application. For example, the infotainment system within a vehicle (e.g., cars, trucks, drones, construction equipment, robots, semi-autonomous vehicles, or autonomous vehicles) may include one or more onboard processors (e.g., central processing units (CPUs), graphics processing units (GPUs), hardware-based deep learning accelerators (DLAs), hardware-based programmable vision accelerators (PVAs)—which may include one or more vector processing units (VPUs), direct memory access (DMA) systems, and/or pixel processing engines (PPEs), hardware-based optical flow accelerators (OFAs), SoCs, etc.), memory and/or storage (e.g., for storing control algorithms, sensor data, and one or more machine learning models), and memory and/or storage (e.g., for storing entertainment content, navigation data, and user preferences). The system may use these processors to execute one or more machine learning models to enable features such as occupant monitoring, gesture recognition, and real-time communication with other services through network connectivity. The in-vehicle infotainment system may also use natural language processing (NLP) models to enable voice-based interaction. The one or more machine learning models may be stored locally or accessed through one or more application programming interfaces (APIs) that connect to cloud services, enabling the system to process requests in real-time or near real-time.

In some embodiments, the system and methods described herein may be deployed in a robotics application. For example, a robot or robotic system may include one or more onboard processors (e.g., CPUs, GPUs, hardware-based deep learning accelerators (DLAs), hardware-based programmable vision accelerators (PVAs)—which may include one or more vector processing units (VPUs), direct memory access (DMA) systems, and/or pixel processing engines (PPEs), hardware-based optical flow accelerators (OFAs), SoCs, etc.) and memory and/or storage (e.g., for storing control algorithms, sensor data, and one or more machine learning models). The robotic system may use these processors to execute one or more machine learning models (e.g., language models) that allow it to perform complex tasks autonomously or semi-autonomously, such as interacting with and/or manipulating static and/or dynamic objects, or navigating environments using sensors such as cameras, LiDAR, RADAR, ultrasonic sensors, and more. The system may use sensor fusion techniques to combine data from multiple sensors (e.g., cameras, infrared, LiDAR, RADAR, accelerometers, etc.) to create a comprehensive model of the robot's surroundings. This data may be processed locally on the robot or sent to remote servers for more computationally intensive tasks, such as 3D mapping or SLAM (Simultaneous Localization and Mapping). In one or more embodiments, data from individual robots (e.g., sensor data, task status, or environmental conditions) may be uploaded to the cloud, where centralized AI models can analyze and distribute optimized commands to an entire fleet. In some embodiments, the machine learning model(s) (e.g., language models, vision language models (VLMs), large language models (LLMs), multimodal language models (MMLMs), diffusion models, neural radiance field (NeRF) models, deep neural networks (DNNs), etc.) described herein may be used to allow the robot to perceive and reason about the environment and/or communicate with one or more other robots and/or persons in an environment. In some embodiments, the robot may communicate (e.g., using one or more network interface cards (NICs) and/or data processing units (DPUs)) with one or more locally hosted servers/computing devices and/or with one or more remotely located servers/computing devices (e.g., in one or more data centers).

In some examples, the machine learning model(s) (e.g., deep neural networks, language models, LLMs, VLMs, multimodal language models, perception models, tracking models, fusion models, transformer models, diffusion models, encoder-only models, decoder-only models, encoder-decoder models, neural radiance field (NeRF) models, etc.) described herein may be packaged as one or more cloud-hosted microservices—such as an inference microservice (e.g., NVIDIA NIMs)—which may include a container (e.g., an operating system (OS)-level virtualization package) that may include an application programming interface (API) layer, a server layer, a runtime layer, and/or a model "engine." For example, the inference microservice may include the container itself and the model(s) (e.g., weights and biases). In some instances, such as where the machine learning model(s) is small enough (e.g., has a small enough number of parameters), the model(s) may be included within the container itself. In other examples—such as where the model(s) is large—the model(s) may be hosted/stored in the cloud (e.g., in a data center) and/or may be hosted on-premises and/or at the edge (e.g., on a local server or computing device, but outside of the container). In such embodiments, the model(s) may be accessible via one or more APIs—such as representational state transfer (REST) APIs. As such, and in some embodiments, the machine learning model(s) described herein may be deployed as an inference microservice to accelerate deployment of a model (s) on any cloud, data center, or edge computing system, while ensuring the data is secure. For example, the inference microservice may include one or more APIs, a preconfigured container for simplified deployment, an optimized inference engine (e.g., built using a standardized AI model deployment and execution software, such as NVIDIA's Triton Inference Server, and/or one or more APIs for high-performance deep learning inference, which may include an inference runtime and model optimizations that deliver low latency and high throughput for production applications—such as NVIDIA's TensorRT), and/or enterprise management data for telemetry (e.g., including identity, metrics, health checks, and/or monitoring). The machine learning model(s) described herein may be included as part of the microservice along with an accelerated infrastructure with the ability to deploy with a single command and/or orchestrate and auto-scale with a container orchestration system on accelerated infrastructure (e.g., on a single device or up to data-center scale). As such, the inference microservice may include the machine learning model(s) (e.g., that has been optimized for high-performance inference), an inference runtime software to execute the machine learning model(s) and provide outputs/responses to inputs (e.g., user queries, prompts, etc.), and enterprise management software to provide health checks, identity, and/or other monitoring. As an example, in some embodiments, one or more functions of the geometry reconstruction processing platform 110 may be implemented using a microservice. In some embodiments, the inference microservice may include software to perform in-place replacement and/or updating of the machine learning model(s). When replacing or updating, the software that performs the replacement/updating may maintain user configurations of the inference runtime software and enterprise management software.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, generative AI, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models — such as one or more large language models (LLMs), systems for performing light transport simulation, systems for performing collaborative content creation for 3D assets, systems implemented at least partially using cloud computing resources, and/or other types of systems.

Example Autonomous Vehicle

Figure 7A:
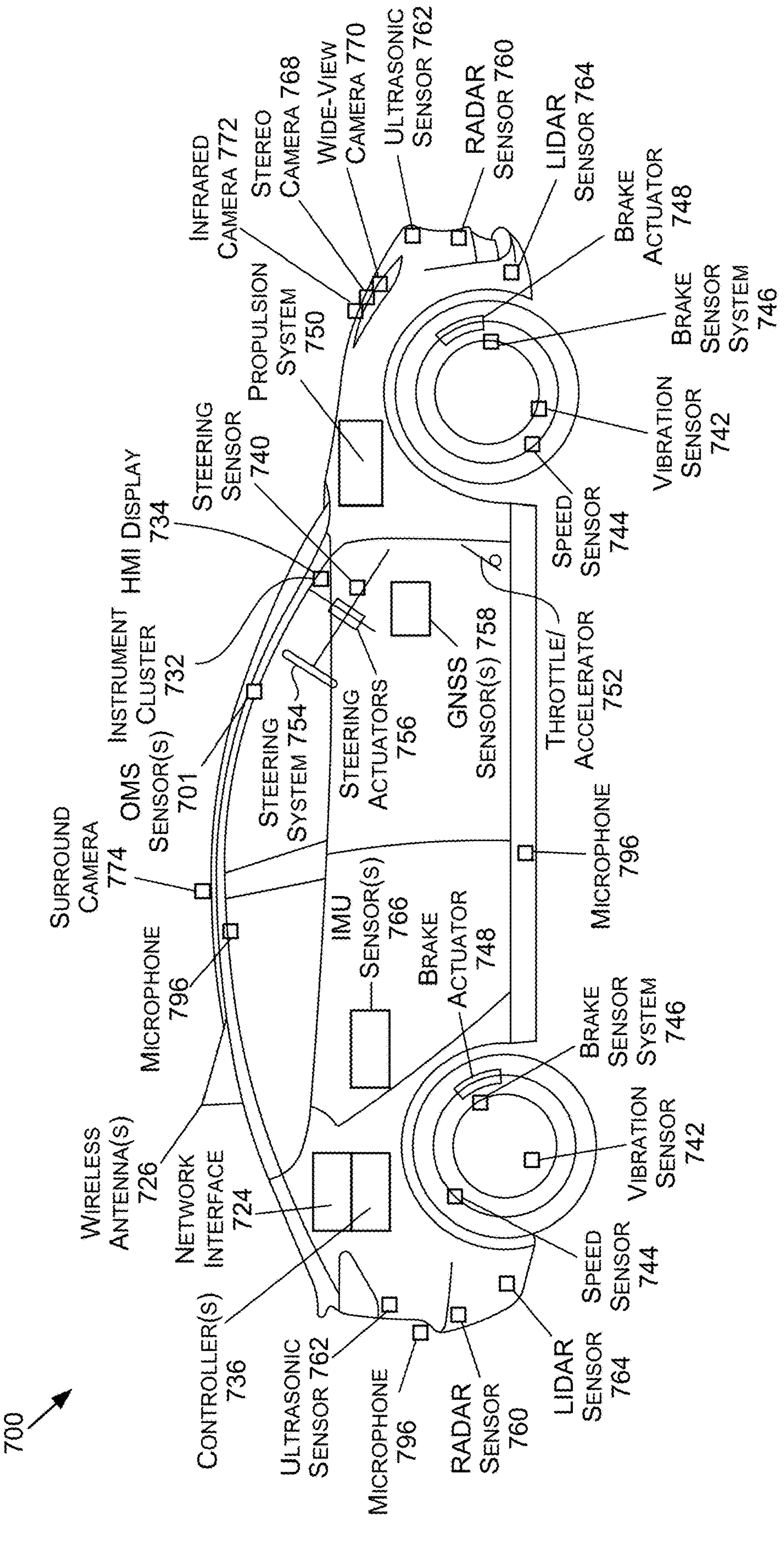
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3—Level 5 of the autonomous driving levels. The vehicle 700 may be capable of functionality in accordance with one or more of Level 1—Level 5 of the autonomous driving levels. For example, the vehicle 700 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 700 or other machine, such as being fully autonomous, being highly autonomous, being conditionally autonomous, being partially autonomous, providing assistive autonomy, being semi-autonomous, being primarily autonomous, or other designation.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to allow the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to allow autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems ("GNSS") sensor(s) 758 (e.g., Global Positioning System sensor(s)), RADAR sensor(s) 760, ultrasonic sensor(s) 762, LiDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), one or more occupant monitoring system (OMS) sensor(s) 701 (e.g., one or more interior cameras), and/or other sensor types.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the High Definition ("HD") map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 726 may also allow communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 7B:
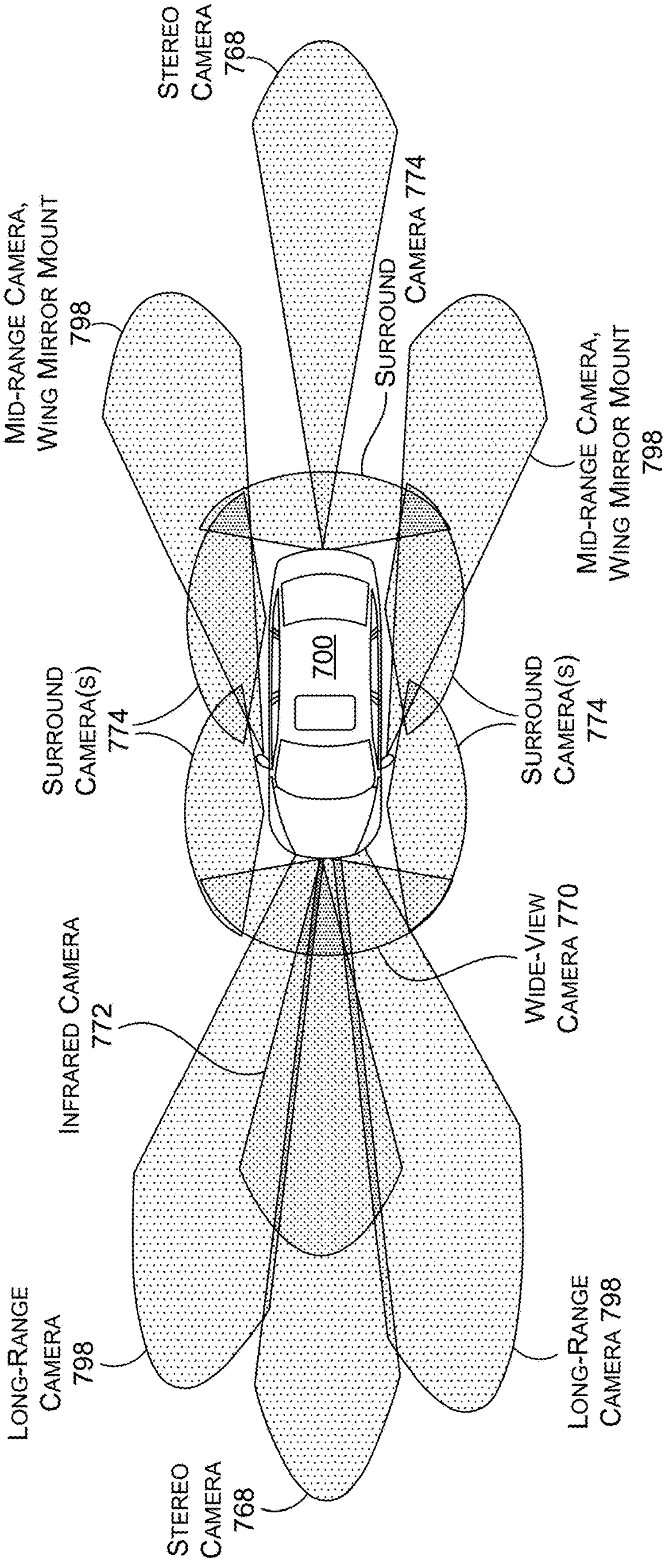
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may be any number (including zero) of wide-view cameras 770 on the vehicle 700. In addition, any number of long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

Any number of stereo cameras 768 may also be included in a front-facing configuration. In at least one embodiment, one or more of stereo camera(s) 768 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Cameras with a field of view that include portions of the interior environment within the cabin of the vehicle 700 (e.g., one or more OMS sensor(s) 701) may be used as part of an occupant monitoring system (OMS) such as, but not limited to, a driver monitoring system (DMS). For example, OMS sensors (e.g., the OMS sensor(s) 701) may be used (e.g., by the controller(s) 736) to track an occupant's and/or driver's gaze direction, head pose, and/or blinking. This gaze information may be used to determine a level of attentiveness of the occupant or driver (e.g., to detect drowsiness, fatigue, and/or distraction), and/or to take responsive action to prevent harm to the occupant or operator. In some embodiments, data from OMS sensors may be used to allow gaze-controlled operations triggered by driver and/or non-driver occupants such as, but not limited to, adjusting cabin temperature and/or airflow, opening and closing windows, controlling cabin lighting, controlling entertainment systems, adjusting mirrors, adjusting seat positions, and/or other operations. In some embodiments, an OMS may be used for applications such as determining when objects and/or occupants have been left behind in a vehicle cabin (e.g., by detecting occupant presence after the driver exits the vehicle).

Figure 7C:
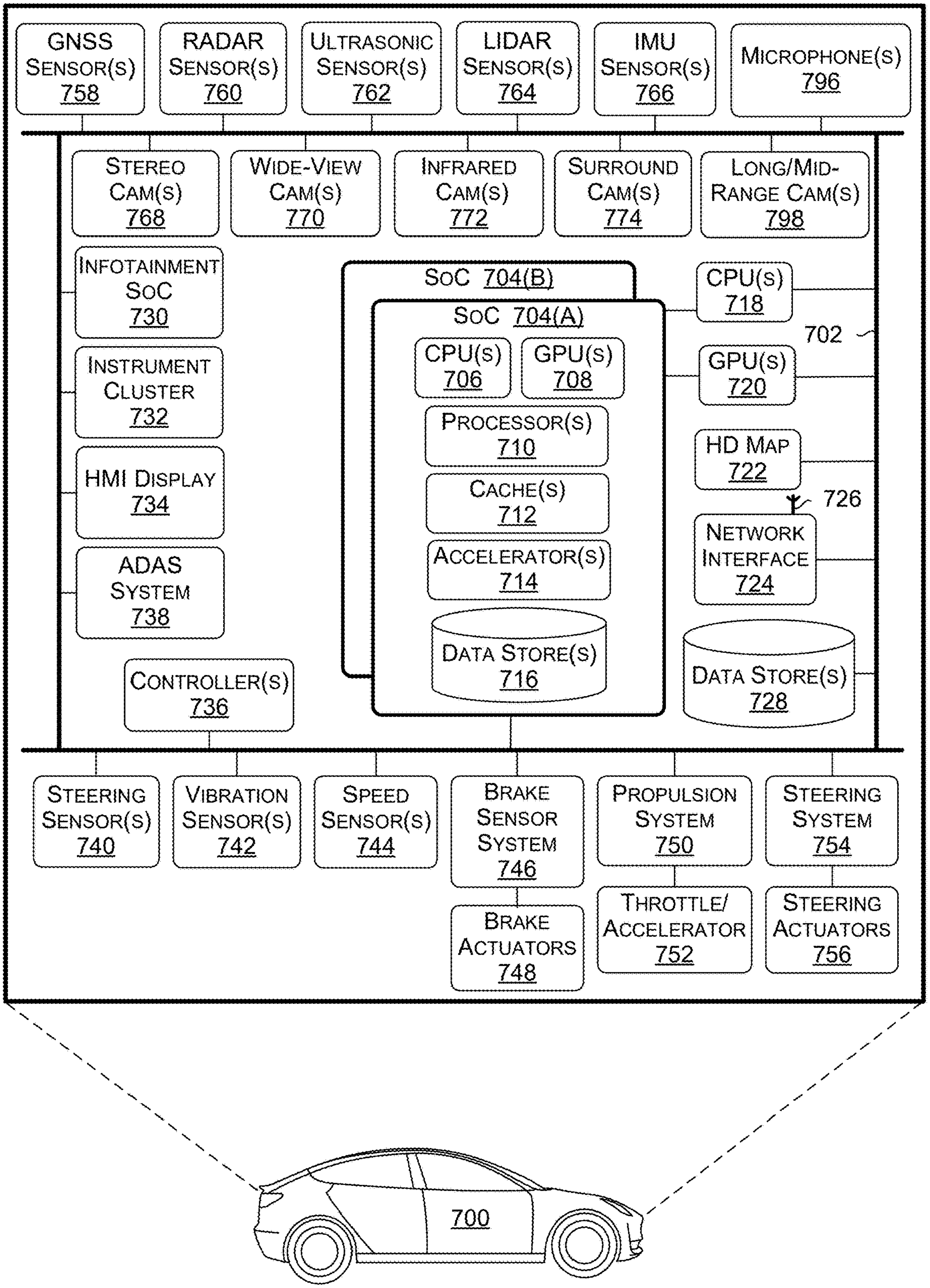
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D). In some embodiments, one or more functions of the geometry reconstruction processing platform 110 may be implemented using code executed on one or more of the CPU(s) 706 and/or GPU(s) 708. In some embodiments SoC(s) 704 may control one or more functions of the vehicle 700 based on sensor data calibrated using an extrinsic calibration based the 3D interior geometry reconstruction 140.

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation allowing any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF 64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to allow finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))—or other math coprocessor or numeric coprocessor types—for performing mathematical operations within the system. For example, the SoC(s) 704 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may allow the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may allow components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S.

patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. As such, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LiDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 716 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to allow communication with peripherals, audio codecs, power management, and/or other devices. The SoC(s) 704 may be used to process data from cameras (e.g., connected over Gigabit Multimedia Serial Link and Ethernet), sensors (e.g., LiDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to allow Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to allow wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS, assisted GPS sensors, differential GPS (DGPS) sensors, etc.), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated using the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LiDAR sensor(s) 764. The LiDAR sensor(s) 764 may be used for object and pedestrian detection, emergency braking, collision avoidance, and/or other functions. The LiDAR sensor(s) 764 may be functional safety level ASIL B. In some examples, the vehicle 700 may include multiple LiDAR sensors 764 (e.g., two, four, six, etc.) that may use Ethernet (e.g., to provide data to a Gigabit Ethernet switch).

In some examples, the LiDAR sensor(s) 764 may be capable of providing a list of objects and their distances for a 360-degree field of view. Commercially available LiDAR sensor(s) 764 may have an advertised range of approximately 700 m, with an accuracy of 2 cm-3 cm, and with support for a 700 Mbps Ethernet connection, for example. In some examples, one or more non-protruding LiDAR sensors 764 may be used. In such examples, the LiDAR sensor(s) 764 may be implemented as a small device that may be embedded into the front, rear, sides, and/or corners of the vehicle 700. The LiDAR sensor(s) 764, in such examples, may provide up to a 120-degree horizontal and 35-degree vertical field-of-view, with a 200 m range even for low-reflectivity objects. Front-mounted LiDAR sensor(s) 764 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 700. Available 3D flash LiDAR systems include a solid-state 3D staring array LiDAR camera with no moving parts other than a fan (e.g., a non-scanning LiDAR device). The flash LiDAR device may use a 5 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may allow the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LiDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. As such, the instrument cluster 732 may be included as part of the infotainment SoC 730, or vice versa.

Figure 7D:
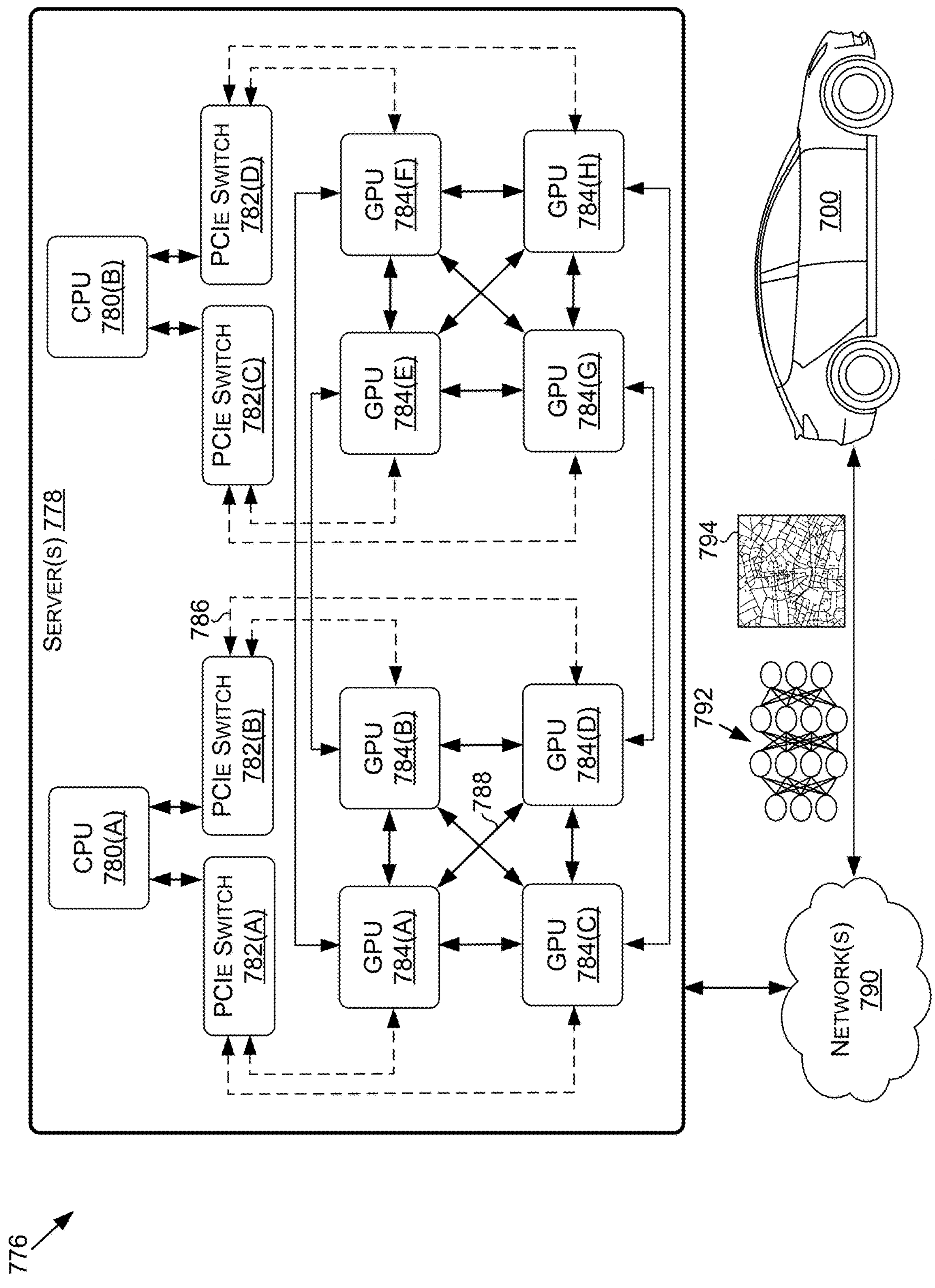
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(D) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated using the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
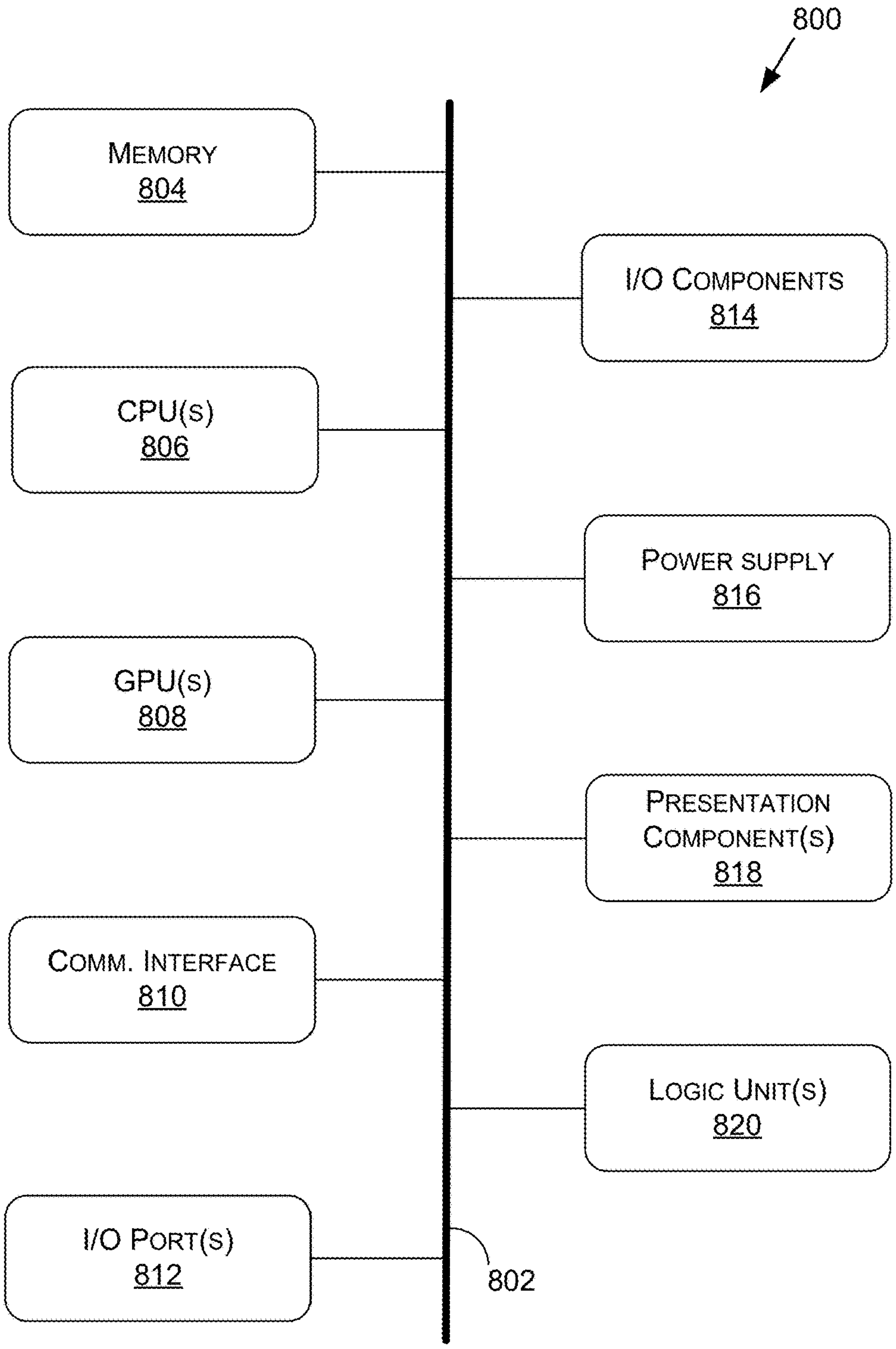
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof. In some embodiments, one or more functions of the geometry reconstruction processing platform 110 may be implemented using code executed on one or more of the CPU(s) 806, GPU(s) 708 and/or logic unit(s) 820.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). As such, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8. In some embodiments, the HMI 130 may be implemented at least in part by one or more of the presentation component(s) 818

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that allow the computing device 800 to communicate with other computing devices via an electronic communication network, included wired and/or wireless communications. The communication interface 810 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may allow the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that allow detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to allow the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
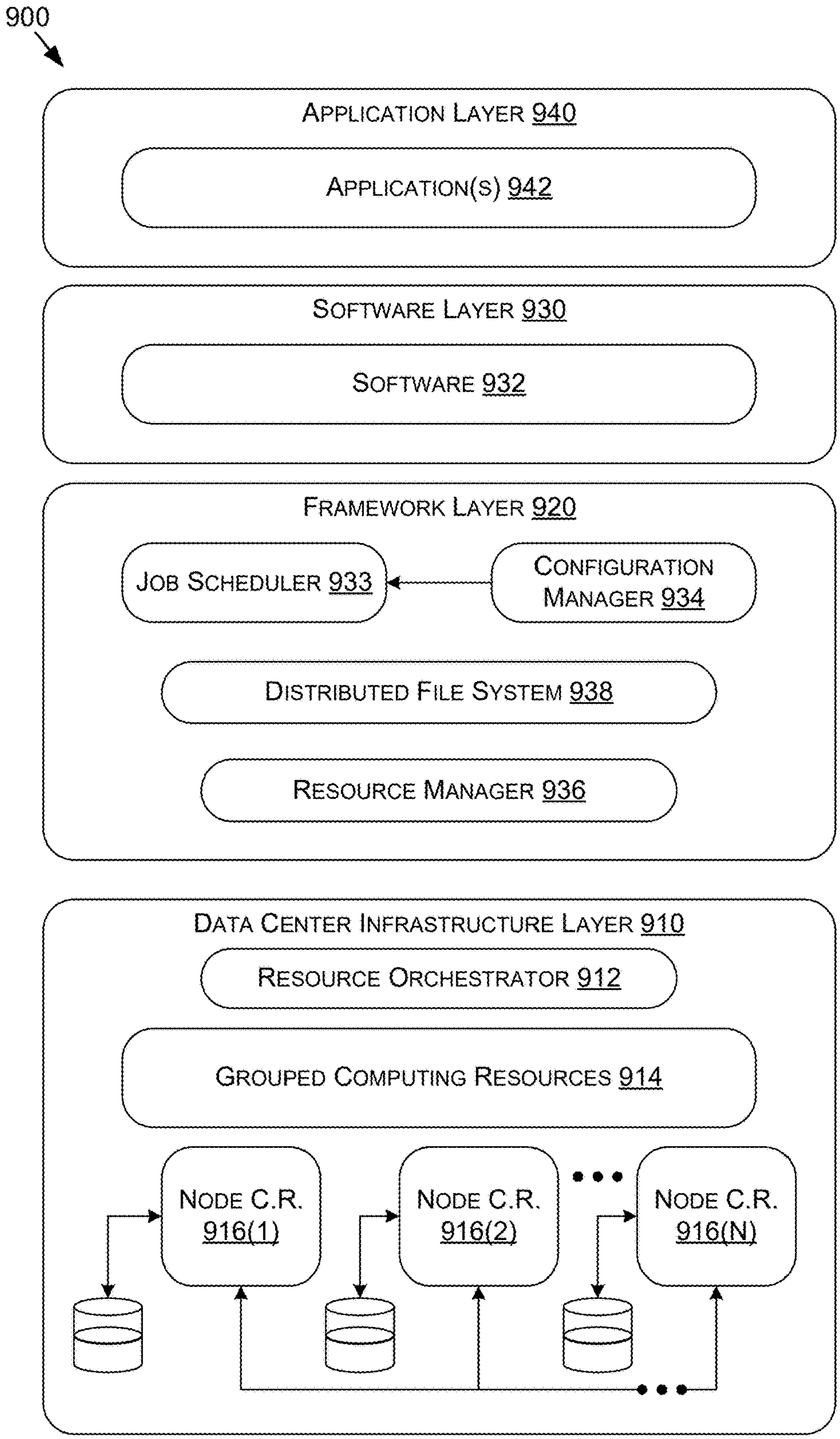
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-916(N) may include one or more virtual components, such as vGPUs, vCPUs, and/or the like, and/or one or more of the node C.R.s 916(1)-916(N) may correspond to a virtual machine (VM). In some embodiments, one or more functions of the geometry reconstruction processing platform 110 may be implemented using code executed on one or more of the node C.R.s 916(1)-916(N).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 933, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may use distributed file system 938 for large-scale data processing (e.g., "big data"). In at least one embodiment, job scheduler 933 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 933. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In some embodiments, one or more functions of the geometry reconstruction processing platform 110 may be implemented at least in part using application(s) 942 and/or software 932.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising processing circuitry to:

select at least one defined region to represent one or more surfaces within a space based at least on a determination of a set of surface points from a geometry model that represents a geometry of the space;

compute a first set of points representing at least a first portion of the one or more surfaces within the at least one defined region;

generate a first 3D bounding shape corresponding to the first set of points, wherein the first 3D bounding shape comprises at least one axis aligned with respect to axes of a first coordinate system;

compute, based at least on the first set of points within the first 3D bounding shape, a first 3D polygon having vertices defined by the first coordinate system; and operate at least one device to execute a function associated with the one or more surfaces based at least on the first 3D polygon.

2. The one or more processors of claim 1, wherein the processing circuitry is further to:

render a representation of the one or more surfaces on a display screen of a human-machine interface based at least on the geometry model, wherein the determination of the set of surface points is based at least in part on inputs received via the human-machine interface.

3. The one or more processors of claim 1, wherein the processing circuitry is further to:

select the at least one defined region based at least on applying the geometry model to a surface selection machine learning algorithm.

4. The one or more processors of claim 1, wherein the processing circuitry is further to:

determine a 3D coordinate in the first coordinate system for at least one point on the one or more surfaces based at least on the first 3D polygon and image data for the space obtained using the at least one device.

5. The one or more processors of claim 1, wherein the processing circuitry is further to control a robot to orient a pointing device at the one or more surfaces based at least on a 3D coordinate in the first coordinate system.

6. The one or more processors of claim 1, wherein the processing circuitry is further to:

determine a 3D coordinate of an intersection of a gaze vector with the first 3D polygon based at least on an image of a face captured by the at least one device.

7. The one or more processors of claim 1, wherein the processing circuitry is further to:

compute one or more extrinsic calibration parameters for the at least one device based at least on the first coordinate system.

8. The one or more processors of claim 1, wherein the first coordinate system is based on at least one of: a frame of reference of the geometry model, a frame of reference associated with a vehicle interior, and a frame of reference associated with a position of the at least one device.

9. The one or more processors of claim 1, wherein the first coordinate system is based at least on a frame of reference determined based at least on a position of the at least one device and extrinsic calibration parameters of the at least one device.

10. The one or more processors of claim 1, wherein the processing circuitry is further to compute the first 3D polygon using a surface fitting algorithm based on a convex hull algorithm.

11. The one or more processors of claim 1, wherein the first 3D bounding shape comprises a bounding box having sides aligned with the axes of the first coordinate system.

12. The one or more processors of claim 1, wherein the processing circuitry is further to:

compute a second set of points representing at least a second portion of the one or more surfaces;

generate a second 3D bounding shape that bounds the second set of points representing at least the first portion, wherein the second 3D bounding shape comprises at least one axis aligned with the at least one axis of the first 3D bounding shape;

compute, using a surface fitting algorithm and based at least on the second set of points within the second 3D bounding shape, a second 3D polygon having one or more vertices defined by the first coordinate system; and operate the at least one device to execute the function associated with the one or more surfaces based at least on the first 3D polygon and the second 3D polygon.

13. The one or more processors of claim 1, wherein the processing circuitry is further to:

render a 3D reconstruction representing the space based at least on the first 3D polygon and the second 3D polygon.

14. The one or more processors of claim 1, wherein the processing circuitry is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for three-dimensional assets;

a system for performing deep learning operations;

a system for performing remote operations;

a system for performing real-time streaming;

a system for generating or presenting one or more of augmented reality content, virtual reality content, or mixed reality content;

a system implemented using an edge device;

a system implemented using a robot;

a system for performing conversational AI operations;

a system implementing one or more language models;

a system implementing one or more large language models (LLMs);

a system implementing one or more vision language models (VLMs);

a system implementing one or more multimodal language models;

a system implemented using one or more cloud-hosted microservices;

a system for generating synthetic data;

a system for generating synthetic data using AI;

a system incorporating one or more virtual machines (VMs);

a system using or deploying one or more inference microservices;

a system that incorporates one or more machine learning models deployed in a service or microservice along with an OS-level virtualization package;

a system implemented at least partially in a data center; or a system implemented at least partially using cloud computing resources.

15. A system comprising one or more processors to:

compute, using a geometry model that represents a geometry of a space, a first set of points representing at least a first region of one or more surfaces, and a second set of points representing at least a second region of the one or more surfaces;

generate a first 3D bounding shape that bounds the first set of points, and a second 3D bounding shape that bounds the second set of points, wherein the first 3D bounding shape and the second 3D bounding shape are co-oriented along at least one axis;

compute, based at least on the first set of points and the second set of points, a first 3D polygon corresponding to the first region and a second 3D polygon corresponding to the second region; and operate at least one device to execute a function based at least on the first 3D polygon and the second 3D polygon.

16. The system of claim 15, wherein the one or more processors are further to:

calibrate one or more extrinsic parameters of the at least one device with a coordinate system based at least on the first 3D polygon and the second 3D polygon.

17. The system of claim 15, wherein the one or more processors are further to:

determine one or more extrinsic parameters of the at least one device based on at least one of: one or more fiducial markers associated with the at least one device, or data from the geometry model indicating a position of the at least one device.

18. The system of claim 15, wherein the function is based at least on a determination of a 3D coordinate for a point on the one or more surfaces within the first 3D polygon or the second 3D polygon.

19. The system of claim 15, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for three-dimensional assets;

a system for performing deep learning operations;

a system for performing remote operations;

a system for performing real-time streaming;

a system for generating or presenting one or more of augmented reality content, virtual reality content, or mixed reality content;

a system implemented using an edge device;

a system implemented using a robot;

a system for performing conversational AI operations;

a system implementing one or more language models;

a system implementing one or more large language models (LLMs);

a system implementing one or more vision language models (VLMs);

a system implementing one or more multimodal language models;

a system implemented using one or more cloud-hosted microservices;

a system for generating synthetic data;

a system for generating synthetic data using AI;

a system incorporating one or more virtual machines (VMs);

a system using or deploying one or more inference microservices;

a system that incorporates one or more machine learning models deployed in a service or microservice along with an OS-level virtualization package a system implemented at least partially in a data center; or a system implemented at least partially using cloud computing resources.

20. A method comprising:

generating one or more 3D polygons representing one or more surfaces within a space based at least on generating points from a geometry model, the points representing one or more regions of the one or more surfaces, and surface fitting one or more bound sets of the points to form the one or more 3D polygons, wherein the one or more bound sets are individually associated with a region of the one or more regions and individually bound based on a bounding shape aligned to a shared 3D coordinate system; and operating at least one device to execute a function associated with the one or more surfaces based at least on the one or more 3D polygons.

* * * * *